US012689968B2

(12) United States Patent
Bhattacharyya et al.

(10) Patent No.: US 12,689,968 B2
(45) Date of Patent: Jul. 21, 2026

(54) METHOD AND SYSTEM OF SENSING THE BEST-CONNECTED FUTURE PATH FOR A MOBILE TELEROBOT

(71) Applicant: Tata Consultancy Services Limited, Mumbai (IN)

(72) Inventors: Abhijan Bhattacharyya, Kolkata (IN); Madhurima Ganguly, Bangalore (IN); Suraj Mahato, Kolkata (IN); Ashis Sau, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 91 days.

(21) Appl. No.: 18/799,234

(22) Filed: Aug. 9, 2024

(65) Prior Publication Data

US 2025/0088940 A1 Mar. 13, 2025

(30) Foreign Application Priority Data

Sep. 7, 2023 (IN) .............................. 202321060067

(51) Int. Cl.
*H04W 40/20* (2009.01)
*G01S 5/10* (2006.01)
(Continued)

(52) U.S. Cl.
CPC .............. *H04W 40/20* (2013.01); *G01S 5/10* (2013.01); *G05D 1/226* (2024.01); *H04W 64/003* (2013.01); *H04W 64/006* (2013.01)

(58) Field of Classification Search
CPC . H04W 40/20; H04W 64/003; H04W 64/006; G01S 5/10; G01S 5/0244;
(Continued)

(56) References Cited

U.S. PATENT DOCUMENTS

| | | | | |
|---|---|---|---|---|
| 9,282,531 B1 * | 3/2016 | Pajovic | ................. | H04W 64/00 |
| 10,425,842 B2 * | 9/2019 | Zhu | ..................... | H04W 16/18 |

(Continued)

FOREIGN PATENT DOCUMENTS

CN 105466421 B 7/2018

OTHER PUBLICATIONS

Rose et al., 3D Trilateration Localization using RSSI in Indoor Environment, 2020, (IJACSA) International Journal of Advanced Computer Science and Applications, vol. 11, No. 2, pp. 385-391.*

(Continued)

*Primary Examiner* — Andrew R Dyer
(74) *Attorney, Agent, or Firm* — Finnegan, Henderson, Farabow, Garrett & Dunner, LLP

(57) ABSTRACT

This disclosure relates generally to a method and system for sensing best-connected future path for a mobile telerobot based on radio signal strength (RSS) prediction algorithm through in-situ radio-sensing. State-of-the-art methods predict the future path from the plurality of possible paths based on a radio-source in the environment. However, prediction of the suitable future path in the absence of the radio-source or in no signal zone is not yet achieved. The proposed in-situ algorithm is based on Log-Normal Shadowing Model (LNSM) and found efficient for prediction error minimization. The method enables the mobile telerobot to predict the future path on a trajectory of the telerobot even without prior knowledge of a radio-source location. The mobile telerobot can predict the most suitable path from a plurality of possible paths for a move based on virtual location estimation.

15 Claims, 25 Drawing Sheets

(51) Int. Cl.
_G05D 1/226_ (2024.01)
_H04W 64/00_ (2009.01)

(58) Field of Classification Search
CPC ........ G01S 5/0273; G01S 5/0294; G01S 3/16;
G05D 1/226
USPC ............................................................. 701/2
See application file for complete search history.

(56) References Cited

U.S. PATENT DOCUMENTS

| | | | | |
|---|---|---|---|---|
| 10,506,386 | B1 * | 12/2019 | de la Broise | H04W 4/029 |
| 11,290,977 | B1 * | 3/2022 | Chinnapalli | G01S 5/14 |
| 11,348,269 | B1 * | 5/2022 | Ebrahimi Afrouzi | G01S 17/48 |
| 2007/0042716 | A1 * | 2/2007 | Goodall | H04W 16/18 |
| | | | | 318/568.11 |
| 2013/0317944 | A1 * | 11/2013 | Huang | G01S 5/02521 |
| | | | | 455/457 |
| 2015/0031390 | A1 * | 1/2015 | Robertson | G05D 1/0272 |
| | | | | 455/456.1 |
| 2015/0205297 | A1 * | 7/2015 | Stevens | G01S 1/7038 |
| | | | | 701/2 |
| 2015/0206409 | A1 * | 7/2015 | Visvanathan | A61B 5/11 |
| | | | | 340/573.1 |
| 2015/0230100 | A1 * | 8/2015 | Atia | H04W 16/22 |
| | | | | 370/252 |
| 2020/0182995 | A1 * | 6/2020 | Zeng | G01S 13/003 |
| 2021/0250110 | A1 * | 8/2021 | Miyatake | G01S 17/931 |
| 2021/0258754 | A1 * | 8/2021 | Bolot | H04W 4/029 |
| 2022/0187841 | A1 * | 6/2022 | Ebrahimi Afrouzi | |
| | | | | G05D 1/0272 |
| 2022/0299590 | A1 * | 9/2022 | Booij | G01S 5/02 |
| 2022/0378269 | A1 * | 12/2022 | Kim | H04W 24/02 |
| 2023/0079658 | A1 * | 3/2023 | Park | G01S 5/0081 |
| | | | | 455/456.1 |
| 2023/0198641 | A1 * | 6/2023 | Peddireddy | H04B 17/27 |
| | | | | 455/456.1 |

OTHER PUBLICATIONS

Cotera et al., Indoor Robot Positioning using an Enhanced Trilateration Algorithm, 2016, International Journal of Advanced Robotic Systems, 13:110, doi: 10.5772/63246, pp. 1-8.*

Valeria M. Salas Pacheco, Trilateration-Based Localization in Known Environments with Object Detection, Oct. 2021, University of South Florida, pp. 1-47.*

Author: Jia Hui Teo, Anbalagan Loganathan, Patrick Goh, and Nur Syazreen Ahmad Title: Autonomous Mobile Robot Navigation via RFID Signal Strength Sensing Title of the item: International Journal of Mechanical Engineering and Robotics Research Date: 2020 vol. 9; Issue: 8.

Author: Simeon Pande and Kwame S Ibwe Title: Robust Trilateration Based Algorithm for Indoor Positioning Systems Title of the item: Tanzania Journal of Science Date: 2021 vol. 47; Issue: 3.

Author: Yeonju Oh Title: A 360 VR and Wi-Fi T a 360 VR and Wi-Fi Tracking Based Autonomous Telepresence Robot for Virtual Tour Title of the item: Theses Date: 2018.

* cited by examiner

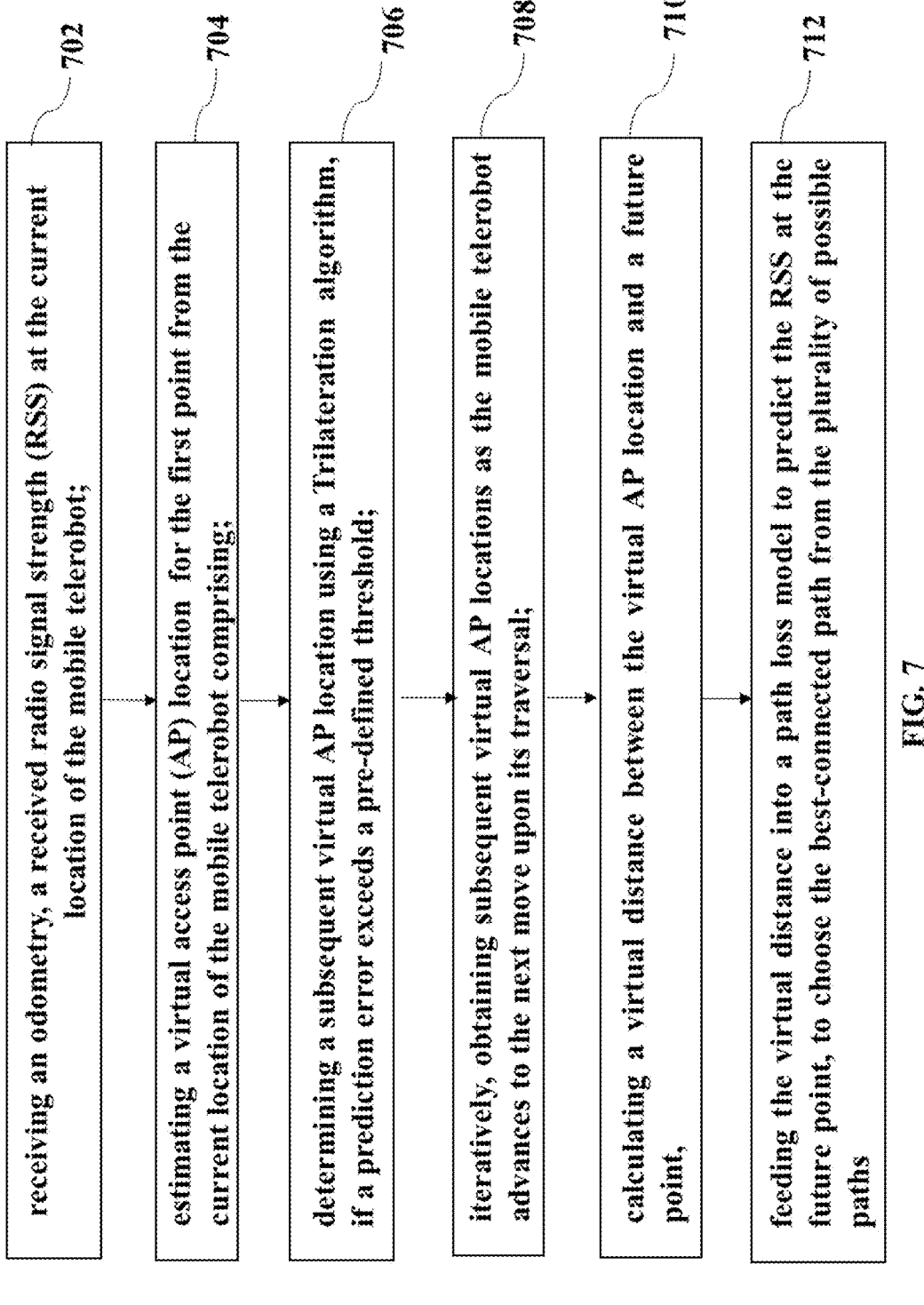

700 receiving an odometry, a received radio signal strength (RSS) at the current location of the mobile telerobot; — 702 estimating a virtual access point (AP) location for the first point from the current location of the mobile telerobot comprising; — 704 determining a subsequent virtual AP location using a Trilateration algorithm, if a prediction error exceeds a pre-defined threshold; — 706 iteratively, obtaining subsequent virtual AP locations as the mobile telerobot advances to the next move upon its traversal; — 708 calculating a virtual distance between the virtual AP location and a future point, — 710 feeding the virtual distance into a path loss model to predict the RSS at the future point, to choose the best-connected path from the plurality of possible paths — 712

FIG. 7

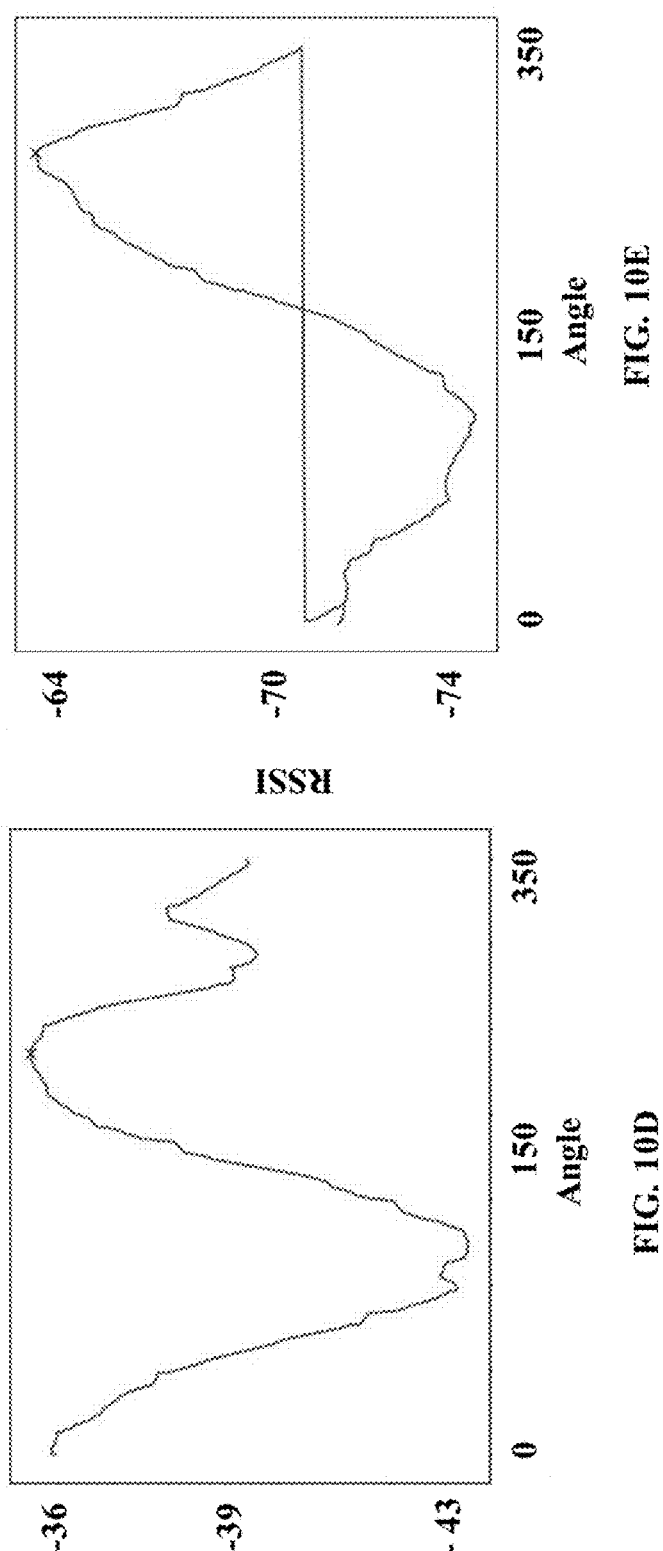

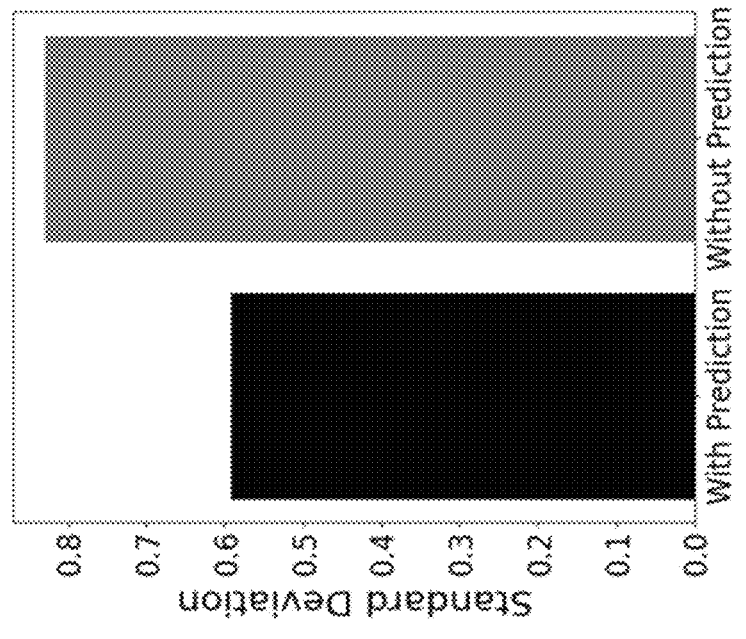
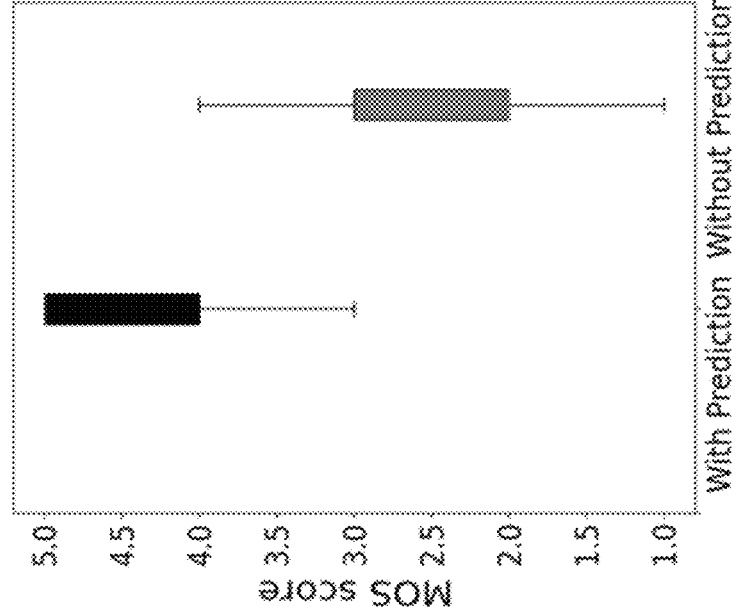
FIG. 17B

METHOD AND SYSTEM OF SENSING THE BEST-CONNECTED FUTURE PATH FOR A MOBILE TELEROBOT

PRIORITY CLAIM

This U.S. patent application claims priority under 35 U.S.C. § 119 to: Indian Patent Application number 202321060067, filed on Sep. 7, 2023. The entire contents of the aforementioned application are incorporated herein by reference.

TECHNICAL FIELD

The disclosure herein generally relates to a method of sensing a best-connected future path for a mobile telerobot, and more particularly, to sense the best-connected path using a radio-source agnostic online radio signal strength (RSS) prediction algorithm.

BACKGROUND

In real life telepresence/teleoperation applications, a mobile telerobot is operated by a remote operator. The mobile telerobot in turn sends feedbacks comprising of a remote video, sensory information, etc. to the operator. Therefore, the presence of a strong connectivity between the mobile telerobot and the remote operator is critical for the performance of any telepresence system. Hence, the remote operator needs to know the possible radio coverage quality in different future directions. The mobile telerobot navigates through a dynamic and an unstructured environment causing spatial and temporal variations in radio signal strength across the environment.

To reach a destination point from a particular source location, the mobile telerobot can have multiple possible paths. The remote operator will always try to choose the shortest possible path to the destination. But the mobile telerobot navigates through an environment where the radio signal strength varies dynamically due to the presence of various static and dynamic obstacles along telerobot's trajectory. Therefore, spatial variations of Received Radio Signal Strength (RSS) in such a dynamic environment depends on a combination of various effects like path loss, shadowing, and multipath fading. Therefore, the telerobot might travel to a no signal zone and thereby lose connectivity with the remote operator. It has been observed in contemporary works that such telerobots are either abandoned or have to re-trace their path back to the source location or a communication safe region. This unnecessarily increases the time required to reach the destination and intermittent connectivity with the remote person compromises with the performance of a telepresence system. Some of the existing works planned an optimal way to the destination with the help of an additional radio sources in the environment. But it creates dependency on the physical environment.

Conventional methods utilize robust RSS prediction algorithm to optimize both motion as well as communication objectives. Some of the works use offline prediction systems thereby making them inefficient for real-time telepresence applications. Most of the online RSS prediction systems make use of either linear regression or Gaussian Random Process based probabilistic models. Although these methods have high accuracy in predicting radio signal strength in unknown & unvisited locations along telerobot's trajectory, they need some prior knowledge regarding the location of radio source which are unknown in practical scenarios. Additionally due to the high computational complexity of such prediction systems they are not so suitable for deployment on real life telerobots and low power IoT devices. Most of the contemporary works require an initial training phase or need to start the navigation of telerobot in vicinity of the radio source. Both of the requirements pose hindrance to the online & real-time performance of telepresence systems.

SUMMARY

Embodiments of the present disclosure present technological improvements as solutions to one or more of the above-mentioned technical problems recognized by the inventors in conventional systems. For example, in one embodiment, a method of sensing the best-connected path for a mobile telerobot is provided. The identification of the best-connected path is based on RSS prediction at future points along the plurality of possible paths the mobile telerobot can take to reach the destination. The RSS prediction revolves around a novel concept of virtual radio source. RSS prediction is based on dynamic localization of the virtual radio source by estimating the RSS at the future unvisited locations using the virtual source and an underlying path loss model. The method includes receiving, via one or more hardware processors, an odometry and a received radio signal strength (RSS) of the current location of the mobile telerobot. The odometry comprises of information/ data provided by a motion sensors of the mobile telerobot to estimate change in position over time. The odometry information gives an estimate of the current position of the mobile telerobot relative to a starting location. The method further includes estimating, via one or more hardware processors, a virtual access point (AP) location from the current location of the mobile telerobot. Estimating the virtual AP location comprises obtaining the first virtual AP location followed by estimating subsequent virtual AP locations. The subsequent virtual AP localization at the current point is only performed when a prediction error between the predicted RSS and the received RSS exceeds a pre-defined threshold at that point. To estimate the first virtual AP location in a trajectory, the mobile telerobot is made to revolve 360 degree at its current position to obtain raw received signal strength (RSS) values along all the directions. The collected raw RSSI values might contain spurious readings due to the presence of various static and dynamic obstacles in the environment. Such raw RSS are filtered through Butterworth order low pass filter with a pre-defined cutoff frequency to omit the spurious readings due to associated static and dynamic factors. The filtered RSS thus obtained is taken further for determining a burst maximum of the filtered RSS values and corresponding peak to obtain a peak angle. The angle corresponding to the peak is treated as the direction of the virtual AP. Based on the peak angle, the first virtual AP location is identified. The method further includes determining, via one or more hardware processors, a subsequent virtual AP location at subsequent points of traversal of the mobile telerobot using a Trilateration algorithm if a prediction error at that point falls beyond a pre-defined threshold. The Trilateration is a special kind of lateration which uses three reference nodes to calculate the position on the unknown node. Trilateration algorithm uses RSSI measurements at points previously traversed by the mobile robot along its trajectory to estimate the subsequent virtual AP location wherein the previously determined virtual AP location becomes an input parameter to the algorithm. Whenever, the Trilateration algorithm is called for the first time, the first virtual AP location is fed as an input to the Trilateration algorithm and upon subsequent iterations, the virtual AP location obtained from the latest iteration becomes the input for the Trilateration algorithm for the next iteration. At any point (x,y) along Telerobot's trajectory, the measured RSS is used to compute the distance of that point from the radio source (i.e. the access point) using the underlying Path Loss Model. To estimate the virtual AP location at (xa, ya), a minimum of three points are necessary to localize the point (xa, ya) which is an intersection point of the three circles. The method further includes iteratively, obtaining, via one or more hardware processors, the subsequent virtual AP locations as the mobile telerobot advances to the next move upon its traversal. The prediction error is computed for each advancing move based on RSSI obtained at the point where the mobile telerobot moves and RSSI value for that current point is predicted at that point using the current RSS prediction model. After The virtual AP localization is performed for the first point, for the subsequent points virtual AP localization is performed only if the prediction error at that point exceeds a pre-defined threshold. Based on the estimated location of virtual AP, P steps ahead RSS prediction is performed. Since the virtual AP localization algorithm is called only when the prediction error crosses a certain threshold, the system is expected to be computationally not so expensive. The method further includes calculating, via one or more hardware processors, a virtual distance between the virtual AP location and a future point. The unvisited future point on the trajectory of the mobile telerobot is identified based on (i) current pose of the telerobot, (ii) a direction of the future point and (iii) the co-ordinates of the current point of the mobile telerobot. After obtaining the future point coordinates, a virtual distance between the future point coordinates and the virtual AP location is calculated. The virtual distance thus obtained is fed to a path loss model to predict the RSS at the future point. The method further includes identifying, via one or more hardware processors, the best-connected path from the plurality of possible paths based on the predicted RSS at the future point. At any point in telerobot's trajectory, prediction of RSS at future, unvisited points along the possible paths to destination helps the remote operator to decide which path to take. Therefore, the telerobot standing at a point can make P steps ahead prediction along different directions based on the calculated RSS at the future point. The calculated RSS at the future path assists the remote operator to choose the best-connected path among the plurality of paths for the mobile telerobot.

In another aspect, a system for sensing best-connected path for a mobile telerobot is provided. The system includes at least one memory storing programmed instructions; one or more Input/Output (I/O) interfaces; and one or more hardware processors, a module for the RSS prediction algorithm, operatively coupled to a corresponding at least one memory, wherein the system is configured to receive, via one or more hardware processors, an odometry and a received radio signal strength (RSS) of the current location of the mobile telerobot. The odometry comprises of information/data provided by a motion sensors of the mobile telerobot to estimate change in position over time. The odometry information gives an estimate of the current position of the mobile telerobot relative to a starting location. The system is further configured to estimate, via one or more hardware processors, a virtual access point (AP) location from the current location of the mobile telerobot. Estimating the virtual AP location comprises obtaining the first virtual AP location followed by estimating subsequent virtual AP locations. The subsequent virtual AP localization at the current point is only performed when a prediction error between the predicted RSS and the received RSS exceeds a pre-defined threshold at that point. To estimate the first virtual AP location in a trajectory, the mobile telerobot is made to revolve 360 degree at its current position to obtain raw received signal strength (RSS) values along all the directions. The collected raw RSSI values might contain spurious readings due to the presence of various static and dynamic obstacles in the environment. Such raw RSS are filtered through Butterworth order low pass filter with a pre-defined cutoff frequency to omit the spurious readings due to associated static and dynamic factors. The filtered RSS thus obtained is taken further for determining a burst maximum of the filtered RSS values and corresponding peak to obtain a peak angle. The angle corresponding to the peak is treated as the direction of the virtual AP. Based on the peak angle, the first virtual AP location is identified. The system is further configured to determine, via one or more hardware processors, a subsequent virtual AP location at subsequent points of traversal of the mobile telerobot using a Trilateration algorithm if a prediction error at that point falls beyond a pre-defined threshold. The Trilateration is a special kind of lateration which uses three reference nodes to calculate the position on the unknown node. Trilateration algorithm uses RSSI measurements at points previously traversed by the mobile robot along its trajectory to estimate the subsequent virtual AP location wherein the previously determined virtual AP location becomes an input parameter to the algorithm. Whenever, the Trilateration algorithm is called for the first time, the first virtual AP location is fed as an input to the Trilateration algorithm and upon subsequent iterations, the virtual AP location obtained from the latest iteration becomes the input for the Trilateration algorithm for the next iteration. At any point (x, y) along Telerobot's trajectory, the measured RSS is used to compute the distance of that point from the radio source (i.e. the access point) using the underlying Path Loss Model. To estimate the virtual AP location at (xa, ya), a minimum of three points are necessary to localize the point (xa, ya) which is an intersection point of the three circles. The system is further configured to iteratively obtain, via one or more hardware processors, the subsequent virtual AP locations as the mobile telerobot advances to the next move upon its traversal. The prediction error is computed for each advancing move based on RSSI obtained at the point where the mobile telerobot moves and RSSI value for that current point is predicted at that point using the current RSS prediction model. After The virtual AP localization is performed for the first point, for the subsequent points virtual AP localization is performed only if the prediction error at that point exceeds a pre-defined threshold. Based on the estimated location of virtual AP, P steps ahead RSS prediction is performed. Since the virtual AP localization algorithm is called only when the prediction error crosses a certain threshold, the system is expected to be computationally not so expensive. The system is further configured to calculate, via one or more hardware processors, a virtual distance between the virtual AP location and a future point. The unvisited future point on the trajectory of the mobile telerobot is identified based on (i) current pose of the telerobot, (ii) a direction of the future point and (iii) the co-ordinates of the current point of the mobile telerobot. After obtaining the future point coordinates, a virtual distance between the future point coordinates and the virtual AP location is calculated. The virtual distance thus obtained is fed to a path loss model to predict the RSS at the future point. The system is further configured to identify, via one or more hardware processors, the best-connected path from the plurality of possible paths based on the predicted RSS at the future point. At any point in telerobot's trajectory, prediction of RSS at future, unvisited points along the possible paths to destination helps the remote operator to decide which path to take. Therefore, the telerobot standing at a point can make P steps ahead prediction along different directions based on the calculated RSS at the future point. The calculated RSS at the future path assists the remote operator to choose the best-connected path among the plurality of paths for the mobile telerobot.

In yet another aspect, a computer program product including a non-transitory computer-readable medium embodied therein a computer program for sensing best-connected path for a mobile telerobot is provided. Further, the computer readable program, when executed on a computing device, causes the computing device to receive, via one or more hardware processors, an odometry and a received radio signal strength (RSS) of the current location of the mobile telerobot. The odometry comprises of information/data provided by a motion sensors of the mobile telerobot to estimate change in position over time. The odometry information gives an estimate of the current position of the mobile telerobot relative to a starting location. Further, the computer readable program, when executed on a computing device, causes the computing device to estimate, via the one or more hardware processors, a virtual access point (AP) location from the current location of the mobile telerobot. Estimating the virtual AP location comprises obtaining the first virtual AP location followed by estimating subsequent virtual AP locations. The subsequent virtual AP localization at the current point is only performed when a prediction error between the predicted RSS and the received RSS exceeds a pre-defined threshold at that point. To estimate the first virtual AP location in a trajectory, the mobile telerobot is made to revolve 360 degree at its current position to obtain raw received signal strength (RSS) values along all the directions. The collected raw RSSI values might contain spurious readings due to the presence of various static and dynamic obstacles in the environment. Such raw RSS are filtered through Butterworth order low pass filter with a pre-defined cutoff frequency to omit the spurious readings due to associated static and dynamic factors. The filtered RSS thus obtained is taken further for determining a burst maximum of the filtered RSS values and corresponding peak to obtain a peak angle. The angle corresponding to the peak is treated as the direction of the virtual AP. Based on the peak angle, the first virtual AP location is identified. Further, the computer readable program, when executed on a computing device, causes the computing device to determine, via the one or more hardware processors, a subsequent virtual AP location at subsequent points of traversal of the mobile telerobot using a Trilateration algorithm if a prediction error at that point falls beyond a pre-defined threshold. The Trilateration is a special kind of lateration which uses three reference nodes to calculate the position on the unknown node. Trilateration algorithm uses RSSI measurements at points previously traversed by the mobile robot along its trajectory to estimate the subsequent virtual AP location wherein the previously determined virtual AP location becomes an input parameter to the algorithm. Whenever the Trilateration algorithm is called for the first time, the first virtual AP location is fed as an input to the Trilateration algorithm and upon subsequent iterations, the virtual AP location obtained from the latest iteration becomes the input for the Trilateration algorithm for the next iteration. At any point (x, y) along Telerobot's trajectory, the measured RSS is used to compute the distance of that point from the radio source (i.e. the access point) using the underlying Path Loss Model. To estimate the virtual AP location at (xa, ya), a minimum of three points are necessary to localize the point (xa, ya) which is an intersection point of the three circles. Further, the computer readable program, when executed on a computing device, causes the computing device to iteratively obtain, via the one or more hardware processors, the subsequent virtual AP locations as the mobile telerobot advances to the next move upon its traversal. The prediction error is computed for each advancing move based on RSSI obtained at the point where the mobile telerobot moves and RSSI value for that current point is predicted at that point using the current RSS prediction model. After The virtual AP localization is performed for the first point, for the subsequent points virtual AP localization is performed only if the prediction error at that point exceeds a pre-defined threshold. Based on the estimated location of virtual AP, P steps ahead RSS prediction is performed. Since the virtual AP localization algorithm is called only when the prediction error crosses a certain threshold, the system is expected to be computationally not so expensive. Further, the computer readable program, when executed on a computing device, causes the computing device to calculate, via the one or more hardware processors, a virtual distance between the virtual AP location and a future point. The unvisited future point on the trajectory of the mobile telerobot is identified based on (i) current pose of the telerobot, (ii) a direction of the future point and (iii) the co-ordinates of the current point of the mobile telerobot. After obtaining the future point coordinates, a virtual distance between the future point coordinates and the virtual AP location is calculated. The virtual distance thus obtained is fed to a path loss model to predict the RSS at the future point. Further, the computer readable program, when executed on a computing device, causes the computing device to identify, via the one or more hardware processors, the best-connected path from the plurality of possible paths based on the predicted RSS at the future point. At any point in telerobot's trajectory, prediction of RSS at future, unvisited points along the possible paths to destination helps the remote operator to decide which path to take. Therefore, the telerobot standing at a point can make P steps ahead prediction along different directions based on the calculated RSS at the future point. The calculated RSS at the future path assists the remote operator to choose the best-connected path among the plurality of paths for the mobile telerobot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 7 is an exemplary flow diagram for a method of sensing best-connected future path for a mobile telerobot, according to some embodiments of the present disclosure.

FIGS. 10A, 10B, 10C, 10D, and 10E Illustrate obtaining the peak of the burst maximum of filtered RSS values at the five different starting location shown in FIG. 8, according to some of the embodiments of the present disclosure.

FIGS. 11A, 11B, 11C depict RSS in real world environment wherein FIG. 11A shows variation of RSS for the first dataset, FIG. 11B shows variation of RSS in indoor office premises for the second dataset and FIG. 11C shows variation in indoor office premises for the third dataset, according to some of the embodiments of the present disclosure.

FIGS. 17A and 17B shows comparative result based on average time of remotely navigating the telerobot with and without the using disclosed RSS prediction-based algorithm; and a box plot of MOS scores for virtual AP localization, respectively, according to some of the embodiments of the present disclosure.

DETAILED DESCRIPTION

Figure 1:
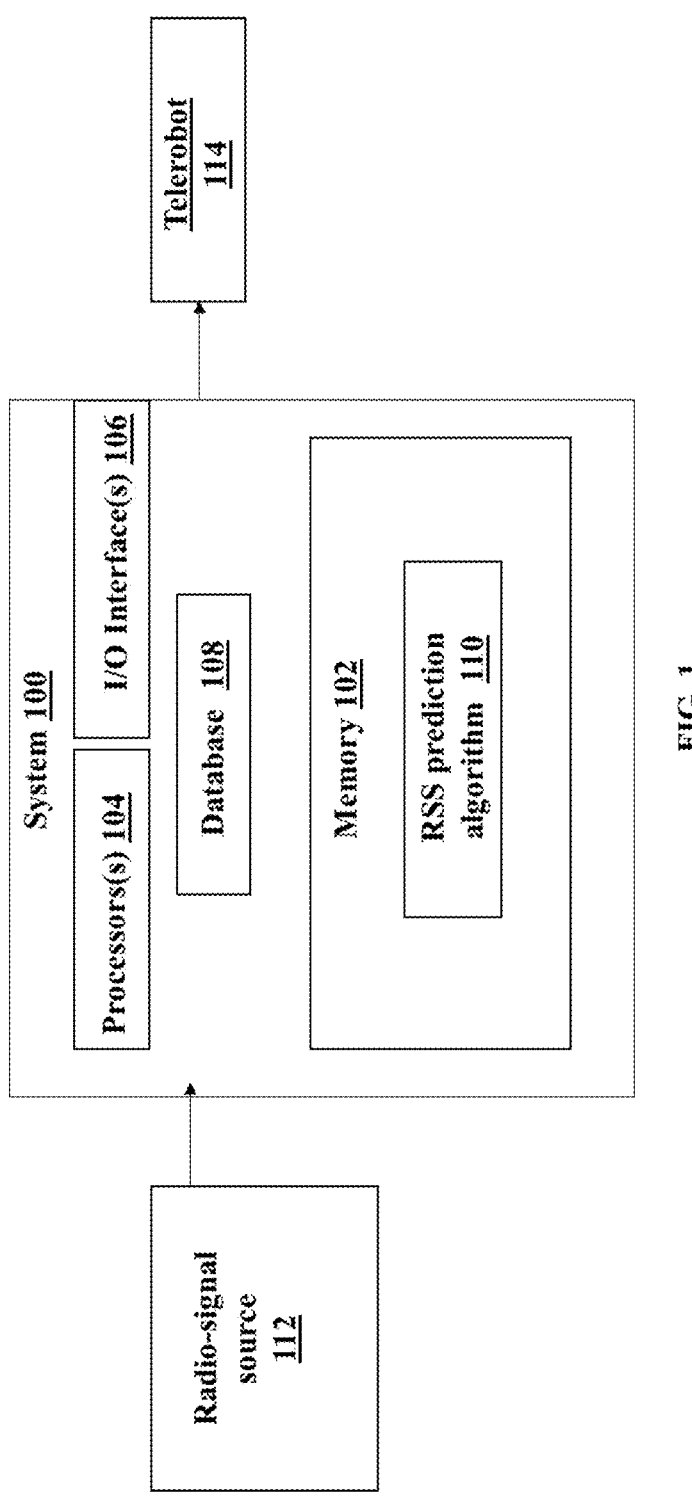
FIG. 1 is a functional block diagram of a system for sensing the best-connected future path for a mobile telerobot, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As used herein, the term Received Signal Strength (RSS) is a measurement of the power of a received radio signal. The RSS is one of the reader outputs, reflecting the power of a received backscattered signal $P_{R_x}$. RSS can be measured in the unit of dbm and calculated as:

$$RSS = 10\,lg\,\frac{P_{R_x}}{1\ mW}$$

As used herein, the term RSSI (Received Signal Strength Indicator) is the strength that the device is hearing a specific device or signal. The Received Signal Strength Indicator (RSSI) measures the amount of power present in a radio signal. It is an approximate value for signal strength received on an antenna.

The mobile telerobot is controlled by a remote operator via a controller communicating with the mobile telerobot. The controller using the RSS prediction algorithm predicts RSS at the future point to assist the remote operator navigating the mobile telerobot.

As used herein, the system is interchangeably referred to as a controller.

Maintaining a good last-mile connectivity across the trajectory of a mobile telepresence telerobot is critical for ensuring quality of service for multimedia, as well as kinematic commands and sensory feedbacks exchanged between the telerobot and the remote operator. Hence, the remote operator needs to know the possible radio coverage quality in different future directions. Existing systems claim to achieve this by trying to predict the channel model. Given the time-varying nature of the radio-environment and the typical set up in an enterprise, the existing solutions are practically infeasible for live deployment. In a real-life telepresence/teleoperation applications, a mobile telerobot is operated by a remote operator. The mobile telerobot in turn sends feedbacks comprising of remote video, sensory information, etc. to the operator. Therefore, the presence of a strong connectivity between mobile telerobot and remote operator is critical for the performance of any telepresence system. To reach a destination point from a particular source location, the mobile telerobot can have multiple possible paths. The remote operator will always try to choose the shortest possible path to the destination. But the mobile telerobot navigates through an environment where the radio signal strength varies dynamically due to the presence of various static and dynamic obstacles along telerobot's trajectory. Therefore, spatial variations of RSS in an such a dynamic environment depends on a combination of effects path loss, shadowing, and multipath fading. Therefore, the telerobot might travel to a no signal zone and thereby lose connectivity with the remote operator.

Embodiments of the present disclosure provide a method and system for sensing the best-connected future path for a mobile telerobot. The method is an in-situ radio-sensing based practically deployable solution with zero-knowledge prediction of the radio-source location and unsupervised prediction of the future connectivity across the periphery of the field of view which does not require any training phase. The method discloses a radio source agnostic RSS prediction algorithm using the novel concept of a 'virtual radio source'. This assists the remote operator to perform RSS predictions at future points along multiple possible paths to the destination and then choose the best-connected future path for the mobile telerobot. Deviating from the conventional channel modelling approach, a novel concept of 'virtual source' based prediction error minimization is disclosed.

Referring now to the drawings, and more particularly to FIG. 1 through FIG. 17 where similar reference characters denote corresponding features consistently throughout the figures, there are shown preferred embodiments and these embodiments are described in the context of the following exemplary system and/or method.

FIG. 1 is a functional block diagram of a system for sensing the best-connected future path for a mobile telerobot, according to some embodiments of the present disclosure. The system 100 acts as a controller that assists remote operator in navigating the remote. In an embodiment, the system 100 includes a processor(s) 104, communication interface device(s) 106, alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like. The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to number of external devices or to another server or devices. The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 102 includes a module for RSS prediction algorithm 110 capable of predicting the best-connected path. The module for RSS prediction algorithm 110 includes programs or coded instructions that supplement applications or functions performed by the system 100 for executing different steps involved in the prediction of best-connected path for a mobile telerobot, being performed by the system 100. The modules, amongst other things, can include routines, programs, objects, components, and data structures, which perform particular tasks or implement particular abstract data types. The module 110 may also be used as signal processor(s), node machine(s), logic circuitries, and/ or any other device or component that manipulates signals based on operational instructions. Further, the module 110 can be used by hardware, by computer-readable instructions executed by the one or more hardware processors 104, or by a combination thereof. The module 110 may include computer-readable instructions that supplement applications or functions performed by the system 100. Further, the memory 102 may comprise information pertaining to input(s)/ output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the module 110. In an embodiment, the database 108 may be external (not shown) to the system 100 and coupled via the I/O interface 106. In one example, the data may be stored in an external system, such as a Lightweight Directory Access Protocol (LDAP) directory and a Relational Database Management System (RDBMS). Functions of the components of the system 100 are now explained with reference to the architecture of the system 100 depicted in FIGS. 1-17.

Figures 2A, 2B:
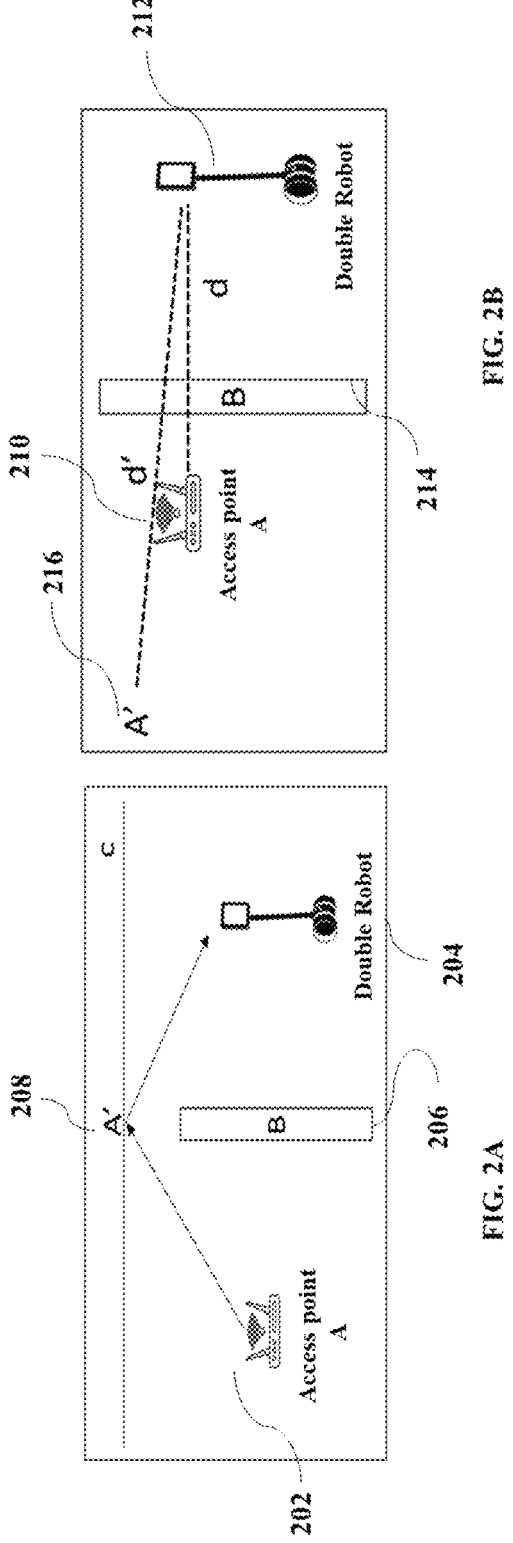
FIGS. 2A and 2B illustrate diagrammatic representations of physical and virtual radio source perceived by the receiver (mobile telerobot), according to some embodiments of the present disclosure.

FIGS. 2A and 2B illustrate diagrammatic representations of physical and virtual radio source perceived by the receiver (mobile telerobot), according to some embodiments of the present disclosure.

As illustrated in the FIGS. 2A and 2B, when a mobile telerobot navigates in the real environment, the reception of signals from the radio-source is affected by various static and dynamic obstacles present in the surroundings. Due to multiple factors between the radio source and the mobile telerobot, the RSS received by a telerobot is different than the RSS value at the Transmitter. The radio signal is not only under the effect of Path Loss but other losses like Shadowing, Multipath fading, etc. Hence, the AP perceived by the receptor of the radio signal i.e. the mobile telerobot referred to as virtual radio source is different from the physical AP. As the mobile telerobot navigates along its trajectory, it collects the odometry and corresponding RSS measurements. The received RSS value RSSi at any point P(xi,yi) is under the effect of path loss, shadowing, multipath fading, and other losses on the path from the radio source to wireless signal receptor at the telerobot. Using a window of past received RSS measurements, the instantaneous location of the virtual source is determined. The virtual AP is determined on the basis of strength of received radio signal, direction of reception of radio signal, etc. hence does not correspond to the physical AP but is an abstraction of the radio source. In FIG. 2A, the location of physical AP is A, but due to the presence of wall B and reflecting surface C, it seems that the reception of radio signal at telerobot happens from location A', therefore A' becomes the virtual AP. Similarly, in FIG. 2B, due to the presence of wall B between the actual radio source A and the mobile telerobot, the received radio signal is much less than expected, therefore to the receptor, the radio source seems far away than actual. Hence the virtual AP A' is farther way than A from the telerobot. The virtual distance d' of any point (x,y) is evaluated using the location of the estimated virtual AP A'(xa',ya'). In FIG. 2B, it can be seen that the virtual distance d'>>>actual physical distance (d) between point M and physical AP. The virtual AP localization is done such that it encompasses the effect of not only path loss but other losses like shadowing and multipath fading too.

Figure 3:
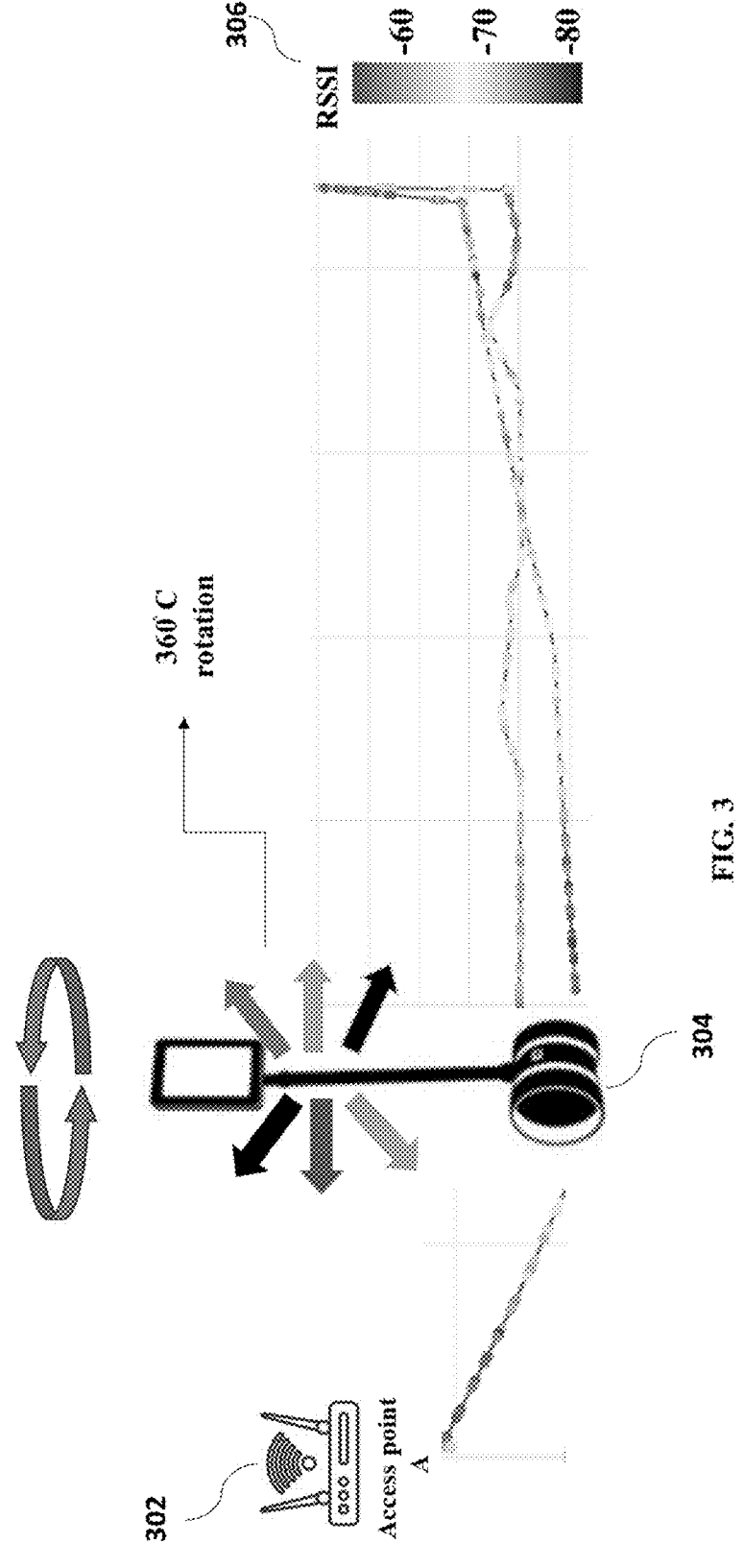
FIG. 3 illustrates the process of access point (AP) localization at the first point by a mobile telerobot, according to some embodiments of the present disclosure.

FIG. 3 illustrates the process of access point (AP) localization by a mobile telerobot, according to some embodiments of the present disclosure.

As illustrated in FIG. 3, the AP localization is essential for sensing the best-connected future path for the mobile telerobot. As illustrated in the FIGS. 2A and 2B, the virtual AP varies from the physical AP in the real-world situation. In the disclosed invention, the virtual AP localization is performed. First the virtual AP localization is executed for a first point in the forward movement of the mobile telerobot's trajectory. Further, the virtual AP localization is executed for subsequent points traversed by the telerobot along its trajectory. Since the virtual AP localization is executed from the first point itself, the disclosed RSS based prediction algorithm does not require an initial training phase which is an advantage over most of the contemporary RSS prediction algorithms. The disclosed invention is based on the Path Loss Model shown in equation 1. The Path Loss Model of equation 1 is shown as:

$$RSS(d, t) = RSS_{d0} - 10\eta log10\left(\frac{d}{d0}\right) \tag{1}$$

where d0 is the reference distance usually 1 m, $RSS_{d0}$ is the received RSS at the reference distance, $\eta$ is the environment dependent path loss parameter and d is virtual distance of the current point from the virtual radio source.

Virtual AP Localization at the First Point:

As illustrated in FIG. 3, to localize the virtual AP at the first point, the mobile telerobot is made to rotate 360°. While rotating along, the mobile telerobot gathers the corresponding RSS measurements. The measured RSS values have spurious reading due to various static and dynamic factors experienced in the real-world situation such as human interference etc. Hence, the collected RSS measurements having spurious readings are passed through a Butterworth order low pass filter with a pre-defined cutoff frequency to omit the spurious readings. According to some embodiment of the present disclosure, the cutoff frequency of 10 is taken for filtering the raw RSS. Then the burst maximum of filtered RSSI values is determined. After, burst maximum is determined, the peak of the burst is identified. The angle corresponding to the peak is treated as the direction of AP. In an embodiment of the present disclosure, the angle corresponding to the peak is θ. Once θ is determined, it is used to localize the virtual radio source (xa,ya) using the following the following set of equations (2&3).

$$xa = dsin(\theta) \tag{2}$$

$$ya = dcos(\theta) \tag{3}$$

where d is the Euclidean distance between first point and AP determined using received RSS value as per equation 4:

$$d = antilog10\frac{RSS_{d0} - RSS(d, t)}{10\eta} \tag{4}$$

Virtual AP Localization at the Subsequent Points:

After estimating the first virtual radio source location based on RSS collected across 360° of telerobot's position, the AP localization is executed for the subsequent points in the telerobot's trajectory. Location estimation of the virtual AP for the subsequent points is achieved using Trilateration based localization technique. At any point (x,y) along telerobot's trajectory, the measured RSS is used to compute the distance d of that point from radio source using the above equation no. 4. Let the location of virtual AP to be estimated be (xa, ya). Thus, any point P(x,y) the telerobot has already traversed in a cartesian plane lies on a circle with radius d centered at (xa, ya). A minimum of three points are necessary to localize the point (xa,ya) which is the intersection point of the three circles with the following set of equations.

$$d_1 = \sqrt{(xa - x_1)^2 + (ya - y_1)^2} \tag{5}$$

$$d_2 = \sqrt{(xa - x_2)^2 + (ya - y_2)^2} \tag{6}$$

$$d_3 = \sqrt{(xa - x_3)^2 + (ya - y_3)^2} \tag{7}$$

Figure 4:
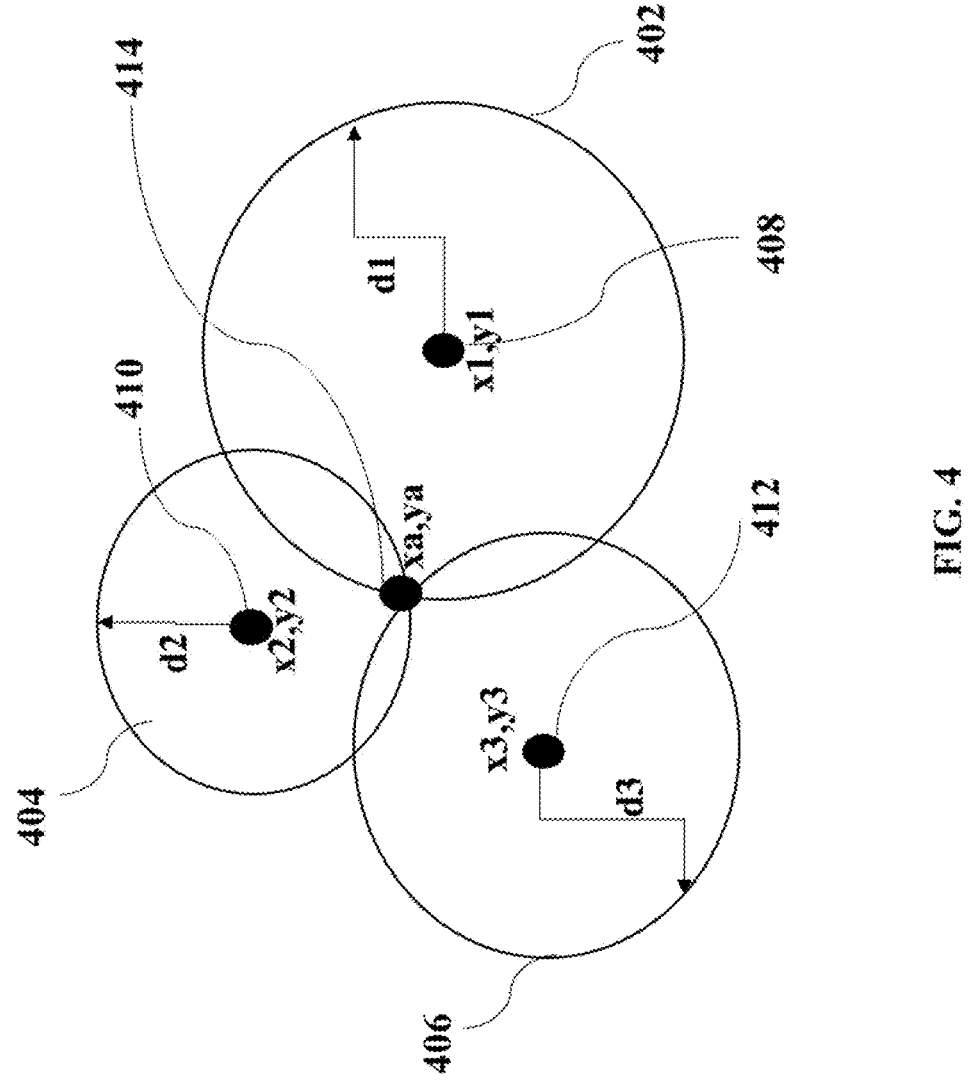
FIG. 4 is an illustration of a geometric way of localizing a virtual AP using Trilateration algorithm as an intersection point of three circles, according to some embodiments of the present disclosure.

There are two unknowns xa and ya and three equations, therefore solving the above system of equations provides the intersection point (xa, ya). The intersection point is the virtual AP and is depicted in FIG. 4 as a geometric way of localizing the virtual using Trilateration. According to an embodiment of the present invention, in the real-world scenario, as the telerobot navigates along its trajectory, it keeps on recording odometry and corresponding RSS measurements. Therefore, it is highly likely to have more than just three points for the virtual AP location. Additionally, a single point of intersection (estimated virtual AP location) of the three circles might not exist. Therefore, trilateration algorithm is utilized as an optimization algorithm to produce the best approximation of the virtual AP location. The trilateration algorithm generates multiple estimates of (xa, ya) and choosing the approximation of the virtual AP from the multiple estimates which minimizes an error function explained below:

Let the virtual AP estimate generated is X and a set of n points [L1, L2, . . . , Ln] already traversed by the mobile telerobot where each traversed point is represented as Li={xi,yi} based on odometry readings and there exists a list of corresponding Euclidean distances of each point from radio source calculated as per equation 4 stored as [d1, d1, . . . , dn].

Error ei for point Li is computed as per equation 8:

$$e_i = d_i - Euclideandistance(X, L_i) \tag{8}$$

Therefore, the equation 8 for errors for each point is based on estimate X for n points. The error function E is computed as mean square error at each point i as per equation 9.

$$E = \sum_{i=1}^{n} e_i/n \tag{9}$$

According to an embodiment of the present disclosure, the optimization of the estimate is based on a L-BFGS-B algorithm which is an extension of the L-BFGS algorithm. The L-BFGS is an acronym for a Limited-memory BFGS (L-BFGS or LM-BFGS) optimization algorithm that approximates the Broyden-Fletcher-Goldfarb-Shanno algorithm (BFGS) using a limited amount of computer memory. The L-BFGS algorithm is a very efficient algorithm for solving large scale problems like identifying best-connected future path in telerobot's trajectory. However, other optimization algorithms can also be utilized for optimizing the estimate. The L-BFGS-B estimated the closest approximation of virtual AP. According to an embodiment of the present disclosure, it is better to provide an initial guess of virtual AP coordinates for a better convergence of the optimization algorithm. The virtual AP coordinates estimated at the first point are provided as an initial estimate to the optimization algorithm for the first time. For the subsequent iterations, the previously estimated virtual AP location can be used as an initial estimate for next round of estimation.

Figure 5:
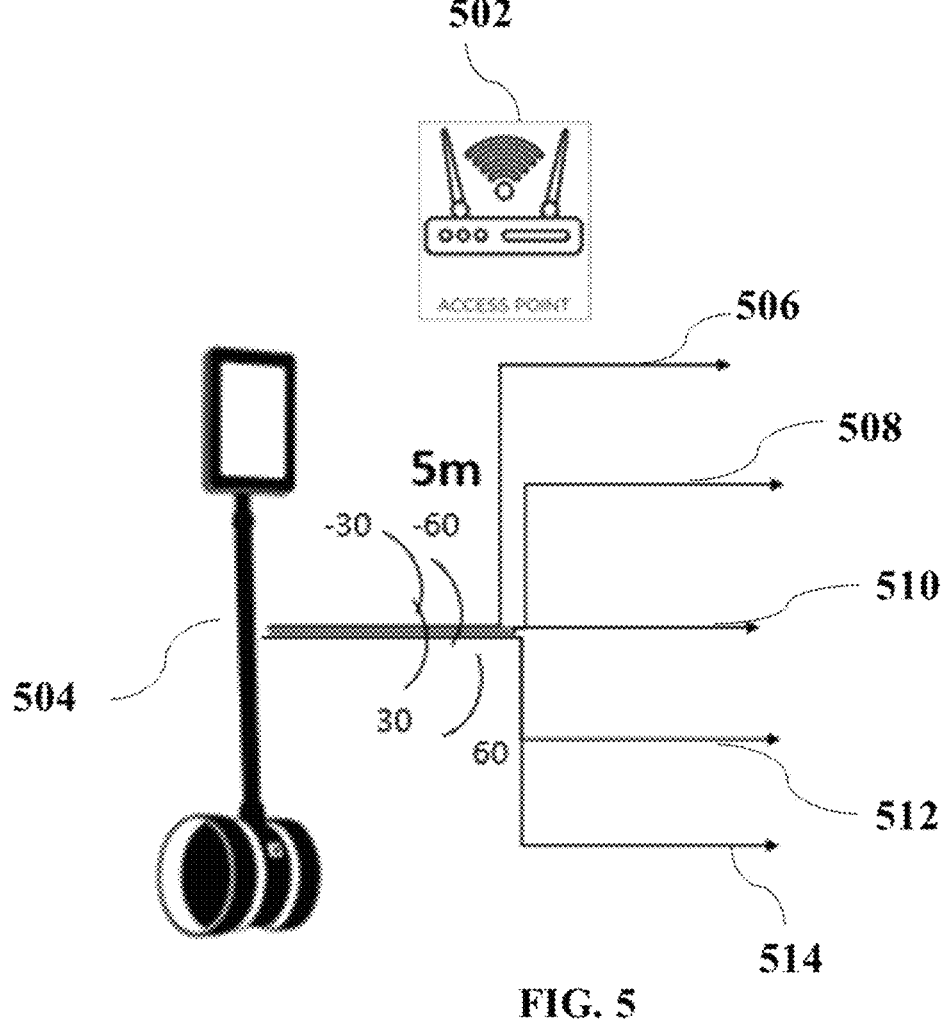
FIG. 5 illustrates the process of opting for the best-connected future path from a plurality of likely future paths, according to some embodiments of the present disclosure.

FIG. 5 illustrates the process of opting for the best-connected future path from a plurality of likely future paths, according to some embodiments of the present disclosure.

As illustrated in FIG. 5, any given point in telerobot's trajectory, prediction of the RSS at future, unvisited points along the possible paths to destination helps the remote operator to decide which path to take. The mobile telerobot is controlled by a remote operator via a controller communicating with the mobile telerobot. Therefore, the telerobot standing at a point can make P steps ahead prediction along different directions. In FIG. 5, the remote operator wants to predict the RSS at a distance 5 meters ahead from the current point along 5 different directions wherein the five different directions are represented by varying degrees as (−60°, −30°, 0°, +30°, and +60° w.r.t to the current pose of the telerobot. Based on the assumption that, if θ is the current pose of the telerobot standing at current position (x,y), coordinates that are P steps ahead in direction β w.r.t to the current pose can be calculated as per equation 10 & 11:

$$x_p = x + (P * \sin(\theta + \beta))$$ (10)

$$y_p = y + (P * \cos(\theta + \beta))$$ (11)

The co-ordinates of the future point $(x_p, y_p)$ are computed from equation 11 and 12 in case of mobile telerobot. According to an embodiment of the present disclosure, the co-ordinates of the future point $(x_p, y_p)$ are computed by the path planner in case of an autonomous telerobot. The path planner is used to compute the virtual distance d (p,AP) of future point from currently estimated AP location using equation 12 as $$d(p, AP) = \sqrt{(x_p - xa)^2 + (y_p - ya)^2}$$ (12)

Feeding the virtual distance (p, AP) of future point thus obtained from the equation 13 in the underlying Path Loss Model gives an estimate of the RSS value at the future point, thereby assisting the tele-operator to choose a stable connectivity path to destination.

The RSS prediction algorithm is presented below:

```
While i> 0:
    Collect x_i, y_i, θ_i, RSS_i at each point i
    If i==1:
        Perform virtual AP localization for first point
    Else:/
        Perform RSS prediction RSS^i_pred for current point using (xa,ya)
        error_i = || RSS^i_pred − RSS^i||
        If error_i > Threshold and i> = 3:
            Perform virtual AP localisation using Trilateration
        Perform P steps ahead RSSI prediction using (xa,ya)
        i++
```

As shown in the algorithm, prediction error is computed for each step based on the RSSI obtained at that point and the RSSI value predicted for the current point based on the current prediction model.

According to an embodiment of the present disclosure, the virtual AP localization is performed for the subsequent points only if the prediction error at that point crosses a certain threshold. Based on the estimated location of virtual AP, the P steps ahead RSS prediction is performed. Since the virtual AP localization algorithm for the subsequent points is called only when the prediction error crosses a certain threshold, the system is expected to be computationally not so expensive.

Figure 6:
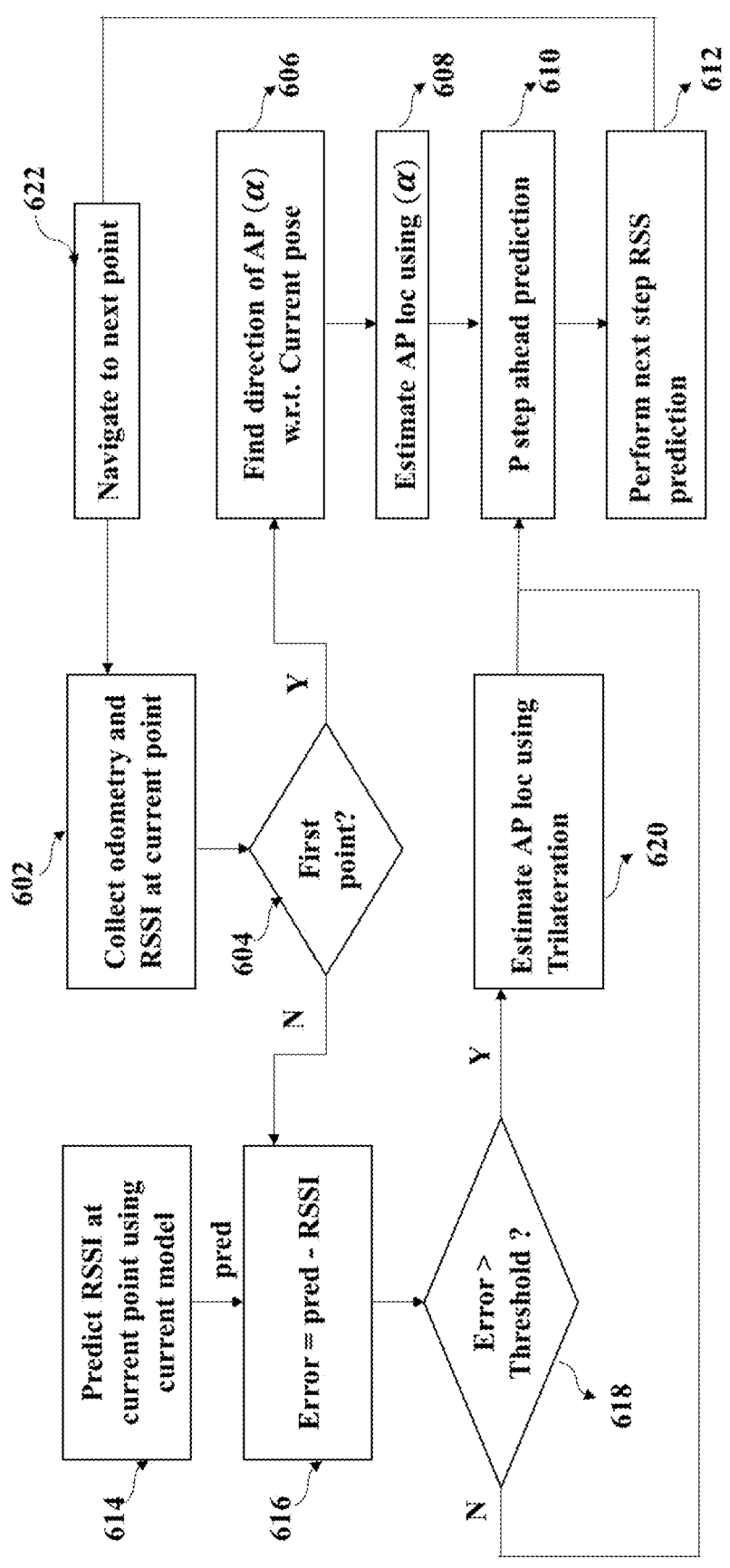
FIG. 6 depicts an architectural flow diagram of the process of sensing best-connected future path based on RSS prediction system, according to some embodiments of the present disclosure.

FIG. 6 depicts an architectural flow diagram of the process of sensing best-connected future path based on RSS prediction system, according to some embodiments of the present disclosure.

As illustrated in FIG. 6, the end-to-end process of sensing the best-connected future path for a mobile telerobot is described. The remotely controlled mobile telerobot traverses in its trajectory and keeps collecting odometry and RSSI 602 at each current point of its travel in its trajectory. The estimation of virtual AP location in the mobile telerobot's trajectory is performed differently for the first point and for the subsequent points. To estimate virtual AP location at first point, The mobile telerobot is made to revolve 360° at its current position to obtain raw RSS values which are then filtered to omit spurious readings caused due to static and dynamic obstacles in the real-world environment. A burst maximum of the filtered RSS values and its corresponding peak is calculated to obtain a peak angle, and the first virtual AP location is obtained using the peak angle. Based on the direction identified, virtual AP location 608 is estimated. The remote operator has multiple possible paths to navigate the mobile telerobot to reach the destination. Further, based on virtual AP location 608, the unvisited future points 610 in the trajectory of the telerobot along the possible paths to destination are predicted which are situated at P steps ahead from the current location of the telerobot. Based on the predicted RSS at P steps ahead future point, the remote operator chooses the best-connected future path for the telerobot, then telerobot navigates to the next point along the chosen path 612. This cycle repeats each advancing step of the mobile telerobot as it moves forward in the trajectory. For subsequent estimation of virtual AP location, the RSS value is predicted at the current point using the current RSS prediction model. This is followed by computing the predicted error as the absolute difference between predicted RSS at that point and received RSS at that point. If the prediction error is found to be more than a threshold 618, the virtual AP localization is performed at that point. Localization of virtual AP corresponds to updating the RSS prediction model as RSS prediction at any future point is achieved using the instantaneous estimated location of virtual radio source. The prediction error crossing the threshold indicates that the prediction model needs an updation hence virtual AP localization needs to be performed, otherwise if prediction error remains within threshold, re-localization of virtual AP at that point is not required. The subsequent virtual AP location 620 is calculated using a Trilateration algorithm. At any point in telerobot's trajectory, telerobot traverses in a cartesian plane that lies on a circle. A minimum of three points are required to localize the AP. So, the intersection point of any three concentric circles at the point of consideration lies the subsequent AP. The process is executed iteratively to obtain subsequent points of traversal in the mobile telerobot's trajectory until virtual AP location is determined. The method is based on RSS prediction. Further, an unvisited future point 610 on the telerobot's trajectory is predicted which is situated at P steps ahead from the current pose of the telerobot. Based on RSS at the predicted future point, the telerobot navigates from the current position to the next point 612. This cycle repeats each advancing step of the mobile telerobot as it moves forward in the trajectory. FIG. 7 is an exemplary flow diagram for a method of sensing best-connected future path for a mobile telerobot, according to some embodiments of the present disclosure.

The steps of the method 700 of the present disclosure will now be explained with reference to the components or blocks of the system 100 as depicted in FIG. 1 through FIG. 17. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 702 of the method 700, the one or more hardware processors 104 are configured to receive an odometry, a received radio signal strength (RSS) at the current location of the mobile telerobot. The odometry comprises of information/data used by a motion sensors of the mobile telerobot to estimate change in position over time. The odometry information gives an estimate of the current position of the mobile telerobot relative to a starting location. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communication network. The order in which the method 700 is described is not intended to be construed as a limitation, and any number of the described method blocks can be combined in any order to implement the method 700, or an alternative method. Furthermore, the method 700 can be implemented in any suitable hardware, software, firmware, or combination thereof. At step 702 of the method 700, the one or more hardware processors receives an odometry information and a radio signal strength (RSS) at the current location of the mobile telerobot. At step 704 of the method 700, the one or more hardware processors estimate a virtual access point (AP) location from the current location of the mobile telerobot. Estimating the virtual AP location comprises obtaining first virtual AP location followed by estimating subsequent virtual AP locations unless a prediction error remains within a pre-defined threshold. To estimate the first virtual AP location in a trajectory, the mobile telerobot is made to revolve at its current position to obtain raw received signal strength (RSS) values. Upon revolving the mobile telerobot at its current position, it captures the RSS across 360° that are influenced by the environmental factors. This causes variation in the RSS due to the presence of various static and dynamic obstacles along telerobot's trajectory. Therefore, spatial variations of RSS in such a dynamic environment depends on a combination of effects like path loss, shadowing, and multipath fading. Such raw RSS are filtered through Butterworth order low pass filter with a pre-defined cut-off frequency to neglect the spurious readings due to associated static and dynamic factors. The filtered RSS thus obtained is taken further for determining a burst maximum of the filtered RSS values and corresponding peak to obtain a peak angle. The angle corresponding to the peak is treated as the direction of AP. Based on the peak angle, the first virtual AP location is identified. At step 706, the one or more hardware processors determines a subsequent virtual AP location using a Trilateration algorithm, if a prediction error falls beyond a pre-defined threshold. The Trilateration is a special kind of lateration which uses three reference nodes to calculate the position on the unknown node. Trilateration algorithm uses RSSI measurements to estimate the subsequent virtual AP location wherein the first AP location becomes an input parameter to the algorithm. At any point (x,y) along Telerobot's trajectory, the measured RSS is used to compute the distance of that point from the radio source (i.e. the access point). To estimate the virtual AP location at (xa, ya), a minimum of three points are necessary to localize the point (xa,ya) which is the intersection point of the three circles. At step 708, the one or more hardware processors, iteratively, obtains the subsequent virtual AP locations as the mobile telerobot advances to the next move upon its traversal. The virtual AP localization is performed for the first point and for the subsequent points only if the prediction error at that point crosses a pre-defined threshold. Based on the estimated location of virtual AP, P step ahead RSS prediction is performed. Since the virtual AP localization algorithm is called only when the prediction error crosses a certain threshold, the system is expected to be computationally not so expensive. At step 710, the one or more hardware processors calculates a virtual distance between the virtual AP location and a future point. The unvisited future point on the trajectory of the mobile telerobot is identified based on (i) current pose of the telerobot, (ii) a direction of the future point and (iii) the co-ordinates of the current point of the mobile telerobot. After obtaining the future point coordinates, a virtual distance between the future point coordinates and the virtual AP location is calculated. The virtual distance thus obtained is fed to a path loss model to predict the RSS at the future point. At step 712, the one or more hardware processors, identifies the best-connected path from the plurality of possible paths based on the predicted RSS at the future point. At any point in telerobot's trajectory, prediction of RSS at future, unvisited points along the possible paths to destination helps the remote operator to decide which path to take. Therefore, the telerobot standing at a point can make P meter ahead prediction along different directions based on the calculated RSS at the future point.

Figure 8:
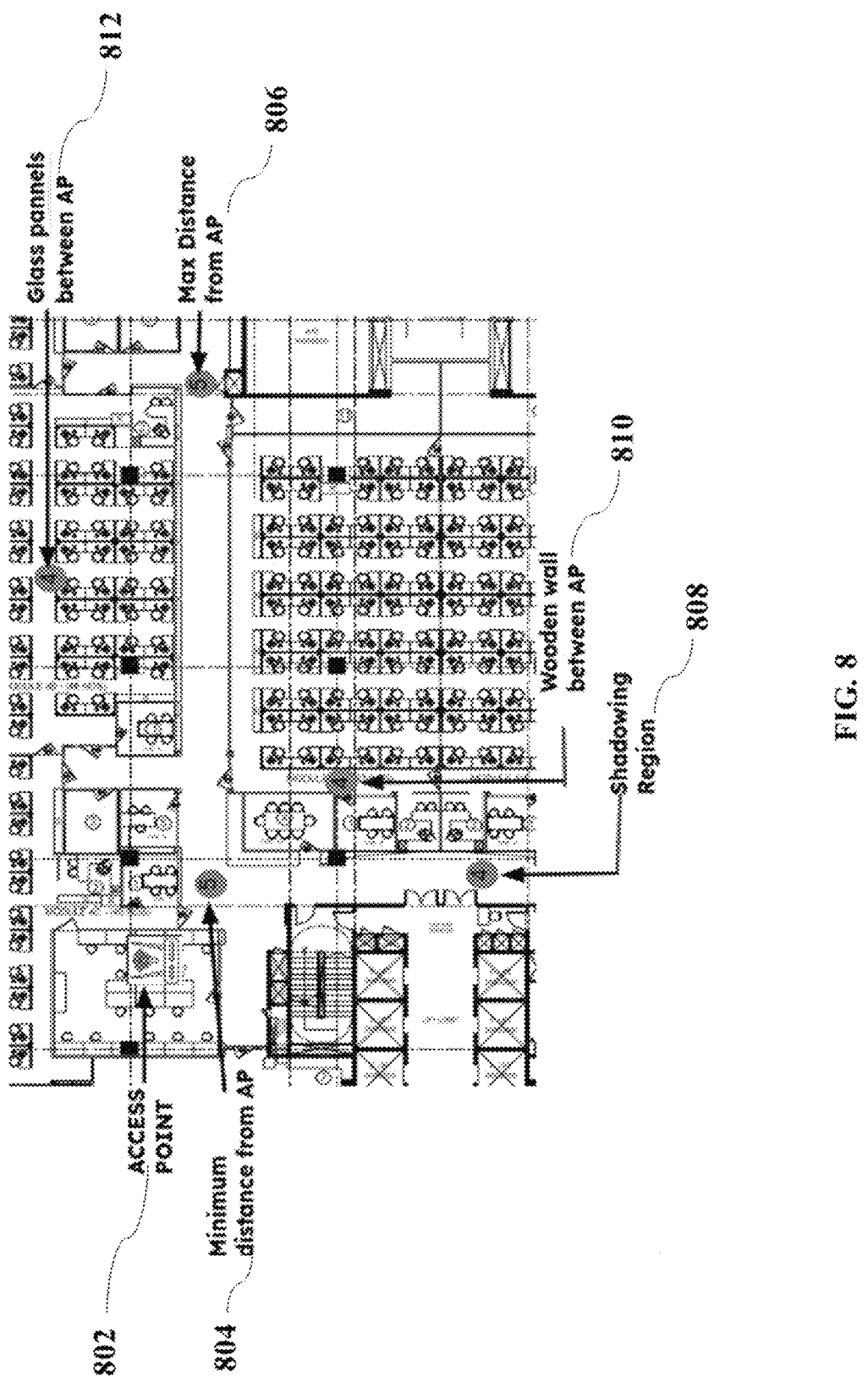
FIG. 8 is a diagrammatic representation of the five locations chosen to localize virtual AP at the first-point in real-life indoor office premises, according to some of the embodiments of the present disclosure.
Figures 9A, 9B:
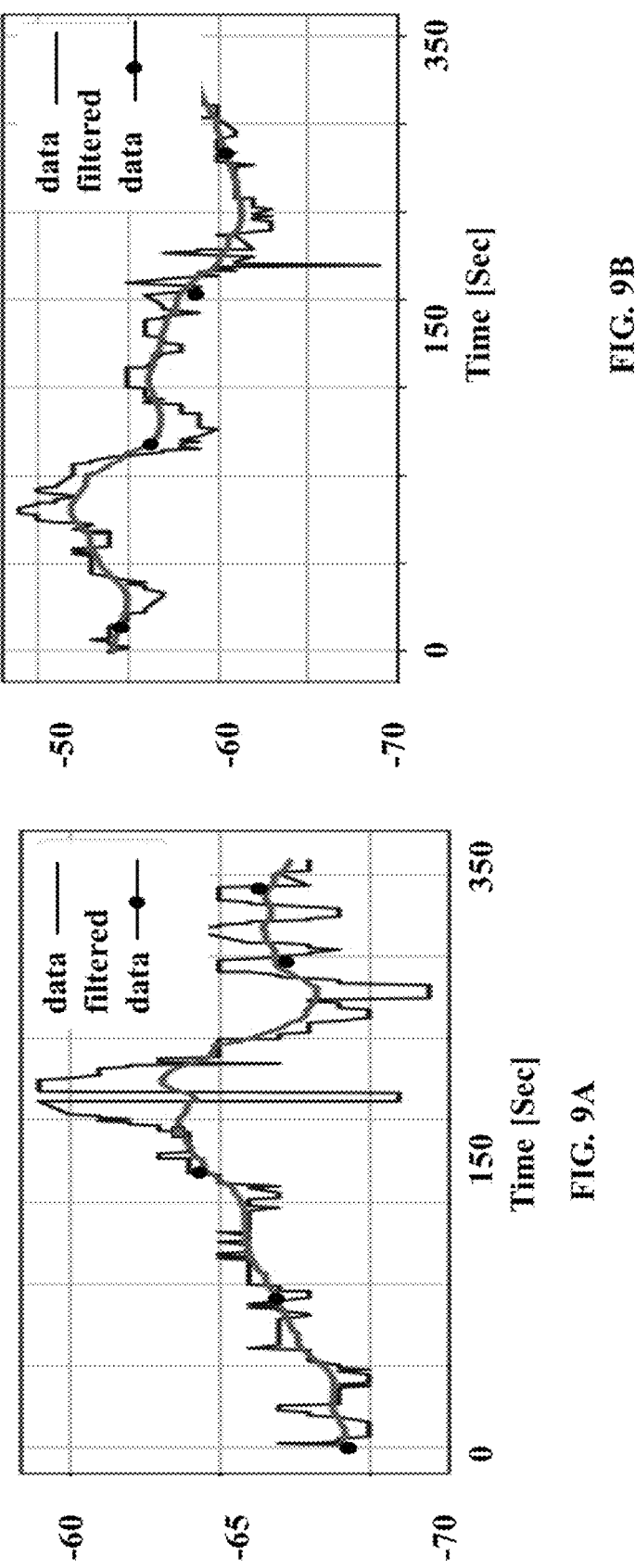
FIGS. 9A, 9B, 9C, 9D, and 9E illustrate filtered RSS measurements collected by 360° rotation of the telerobot at five starting locations as depicted in the FIG. 8, according to some of the embodiments of the present disclosure.
Figure 9C:
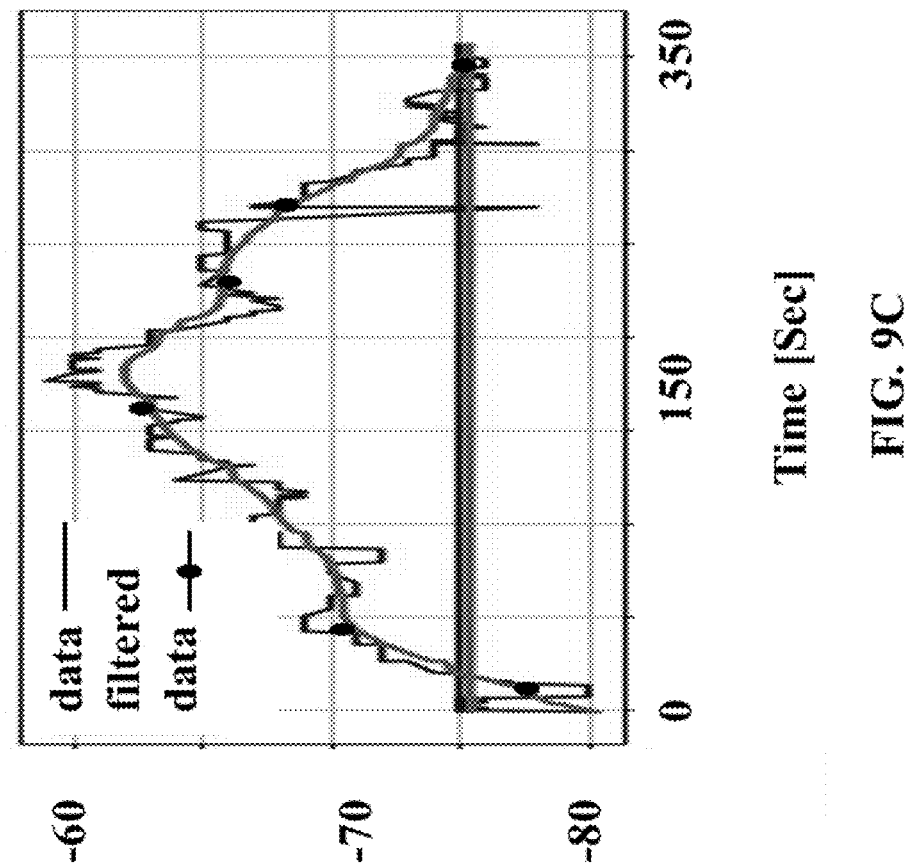
Figure 9D:
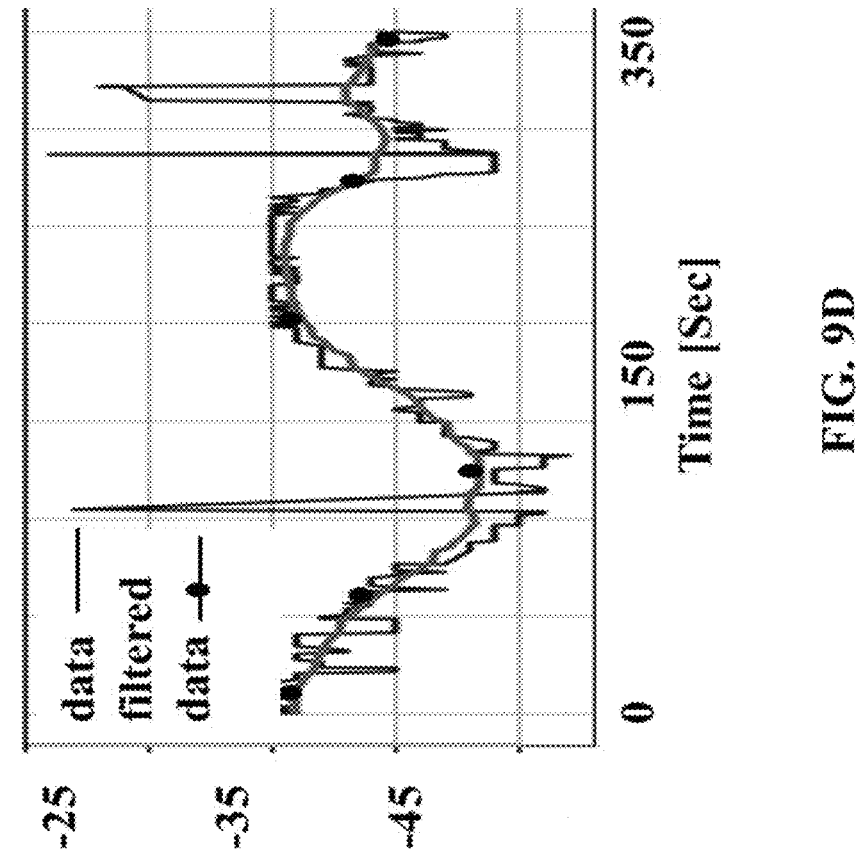
Figure 9E:
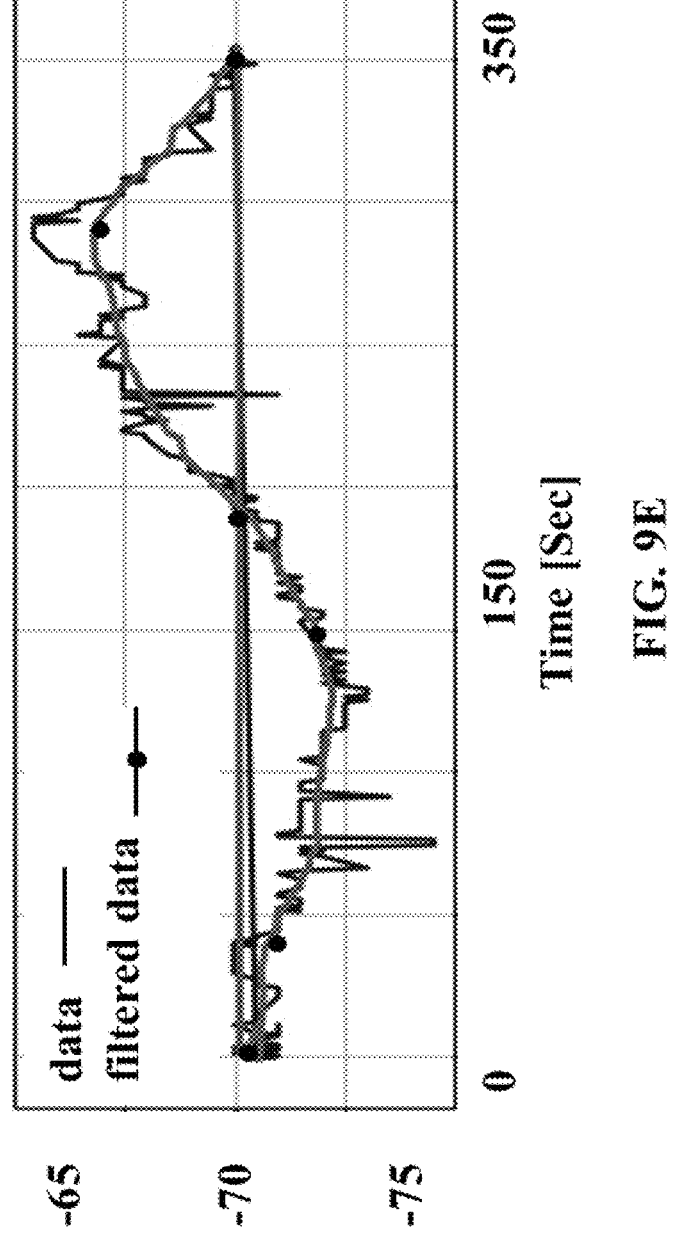
Figure 10B:
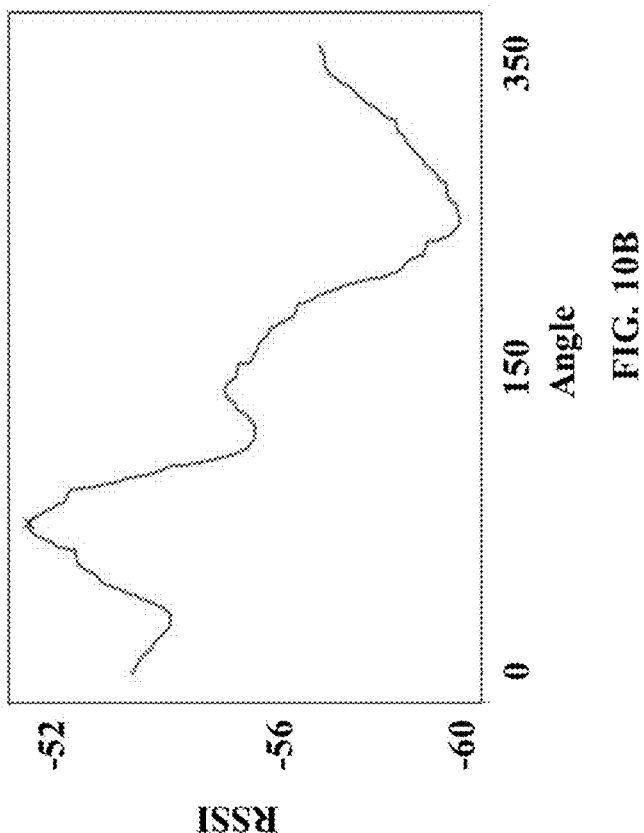
Figure 10A:
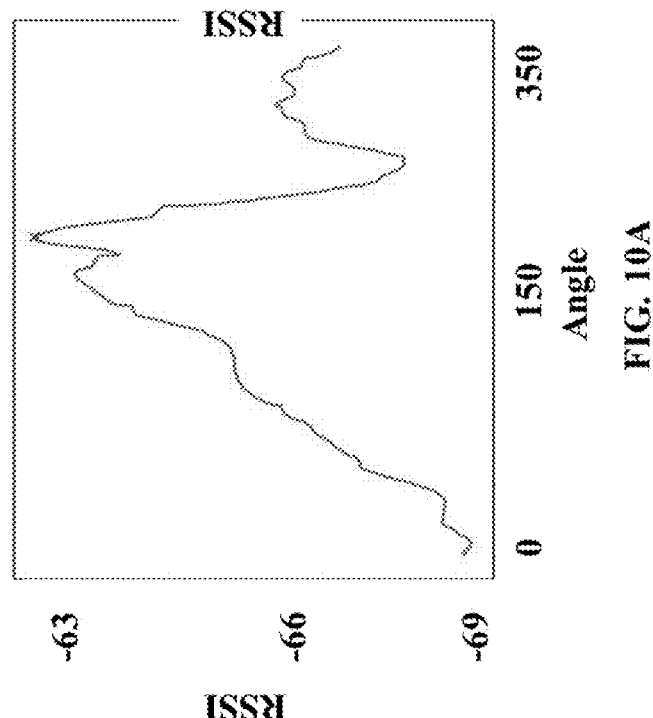
Figure 10C:
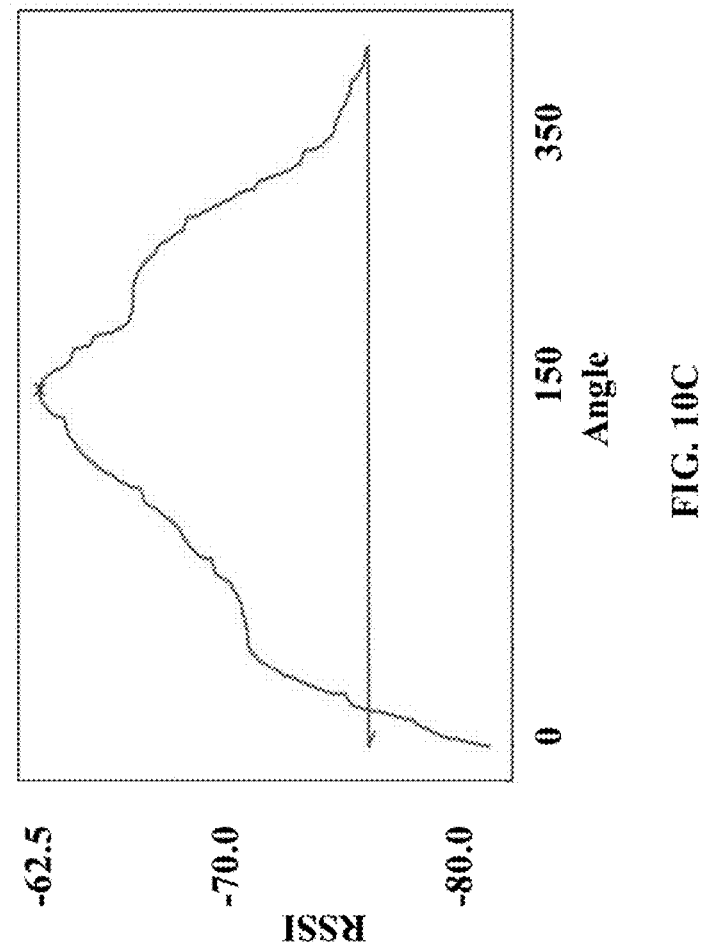

FIG. 8 is a diagrammatic representation of the five locations chosen to localize virtual AP at the first-point in real-life indoor office premises, according to some of the embodiments of the present disclosure.

FIG. 8 is a diagrammatic representation of the five locations chosen to localize virtual AP at the first-point in real-life indoor office premises. The radio-source is placed as an access point 802 in one of the chamber in an office location. Various hinderances/obstructions responsible for the variation of received radio signal at the Telerobot's receptor and the operator are identified as shadowing region 804, wooden wall between AP 806 and glass panels between AP 808. Once AP is started to send the signals, the RSS received at the telerobot is captured. The raw/unfiltered RSS is filtered by passing the raw RSS through Butterworth order low pass filter with a pre-defined cutoff frequency that effectively omits the spurious readings due to associated static and dynamic factors. The Butterworth filter is an analogue filter design which produces the best output response with no ripple in the pass band or the stop band resulting in a maximally flat filter response. FIGS. 9A-9E shows how the spurious RSS measurements collected by 360° rotation of the telerobot is eliminated using a Butterworth order low pass filter for the five different starting locations 1, 2, 3, 4 and 5 as marked in the FIG. 8. Similarly, FIGS. 10A-10E illustrate how the peak of the burst maximum from the filtered values is obtained to determine the direction of virtual AP for the same five points 1, 2, 3, 4 and 5 as marked in the FIG. 8.

Use Case Example Scenario

Figure 11A:
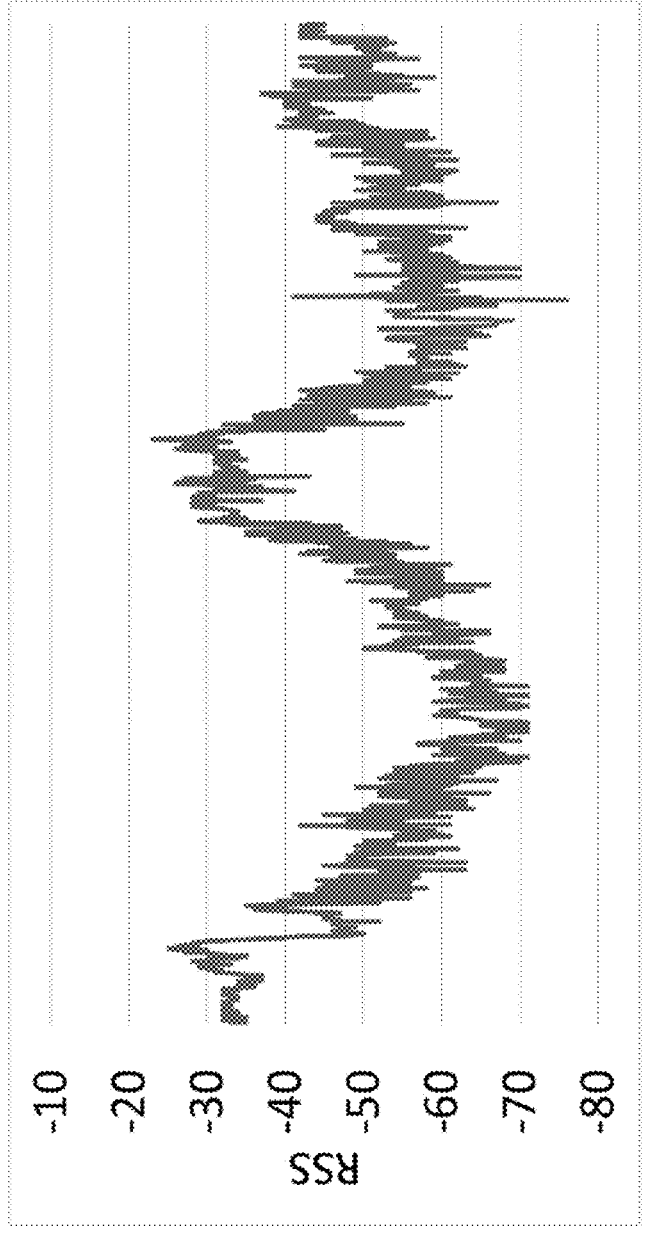
Figure 11C:
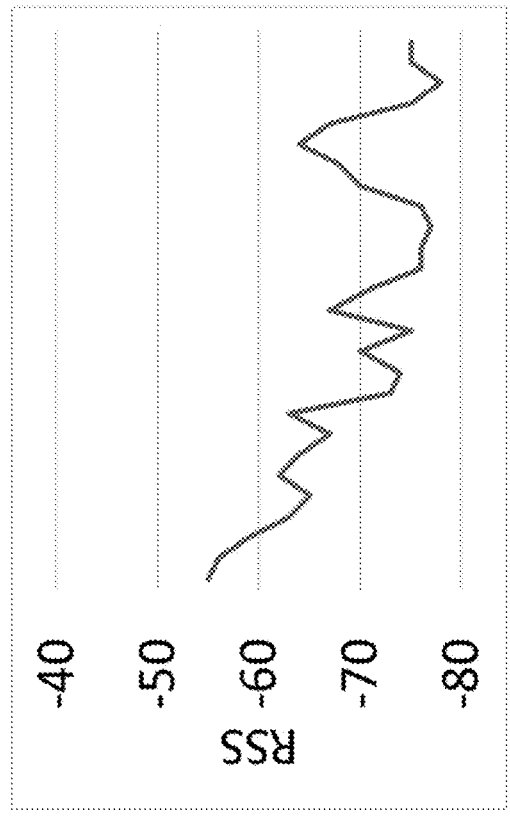
Figure 11B:
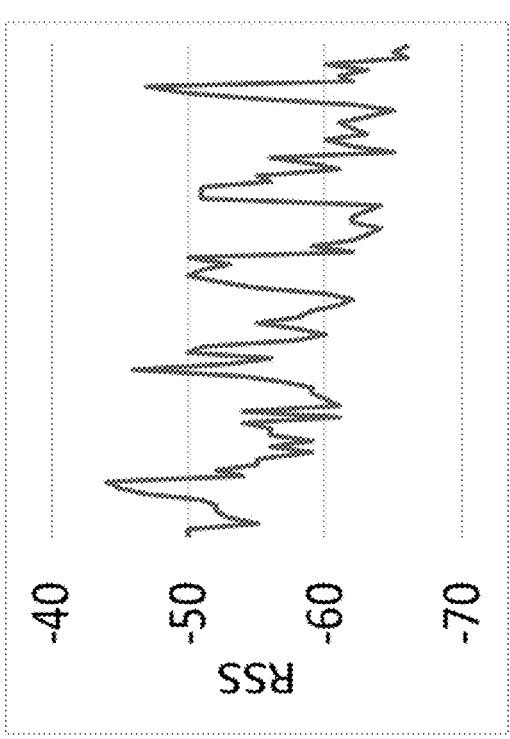
Figure 12:
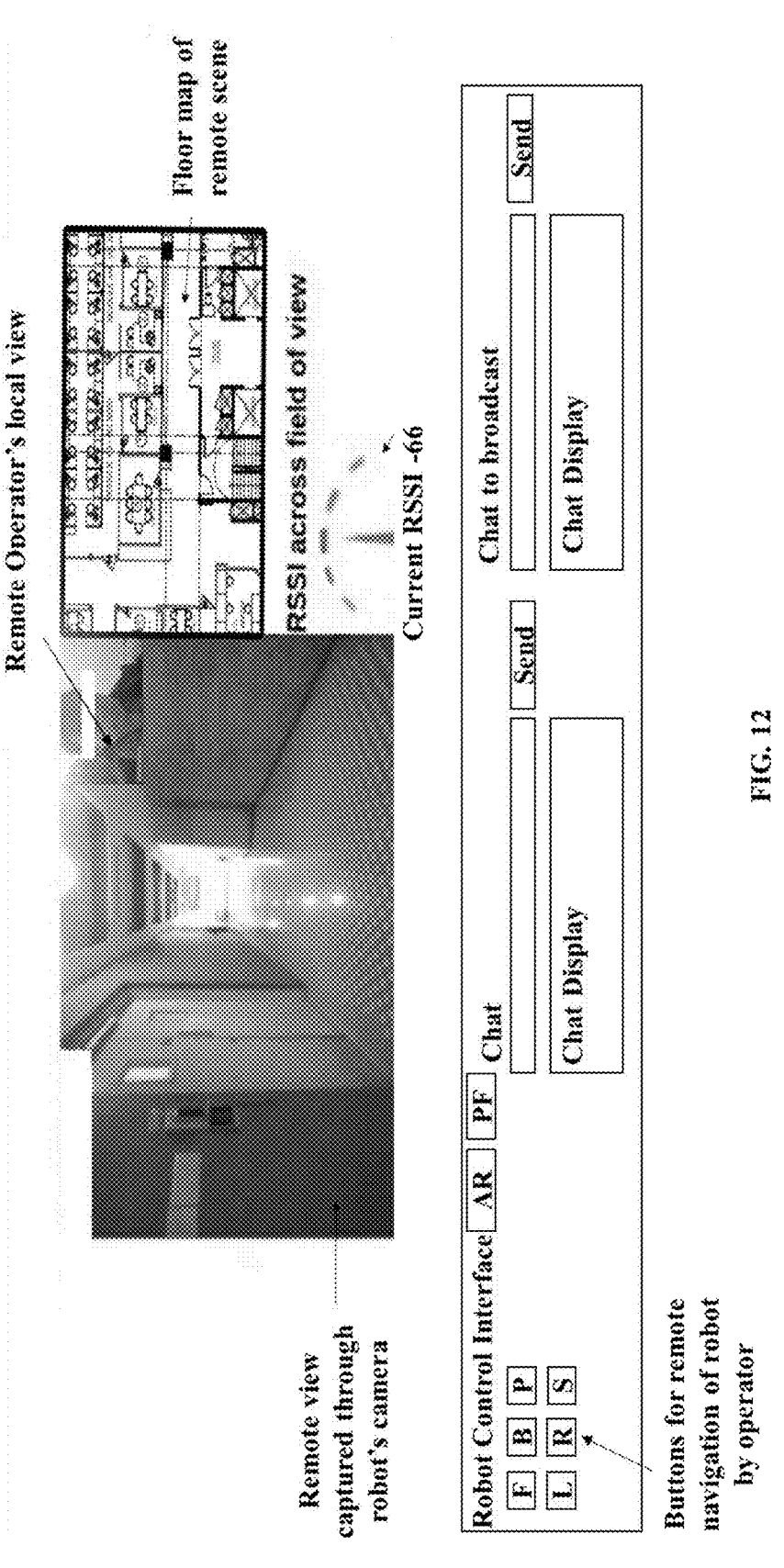
FIG. 12 illustrates an operational setup and a browser page on operator's console while carrying out the experimentation, according to some of the embodiments of the present disclosure.
Figure 13:
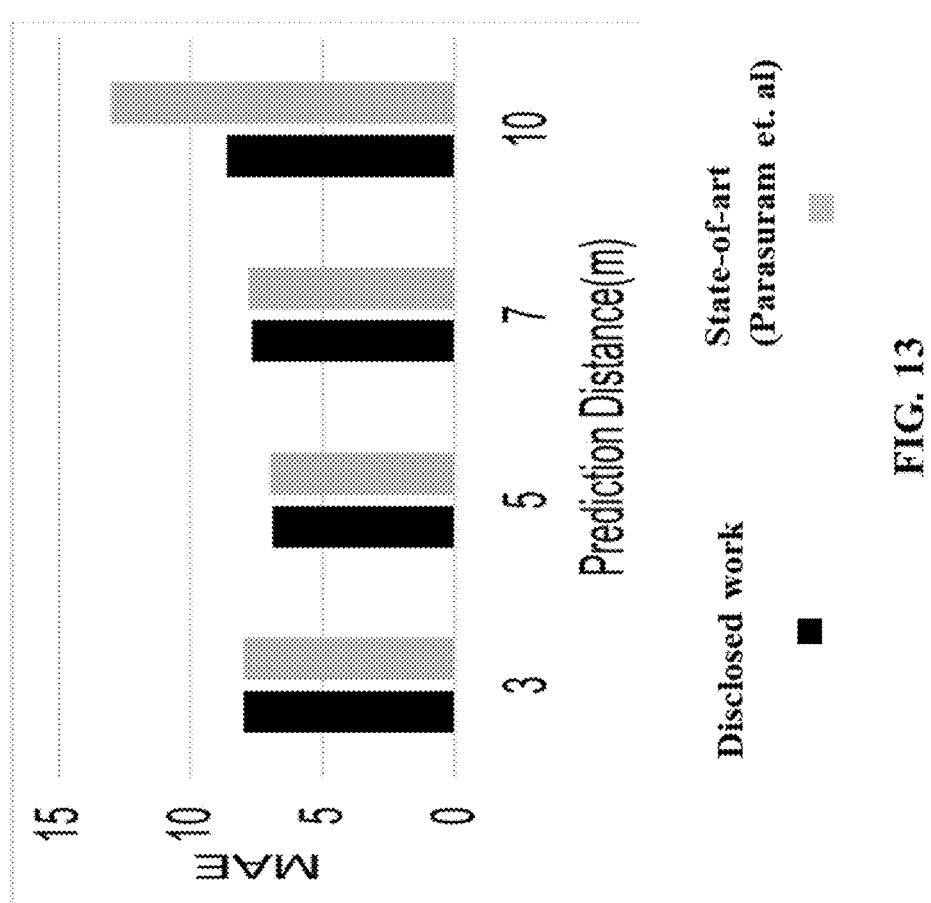
FIG. 13 illustrate comparative results of the disclosed work and the state-of-art based on MAE metric, according to some of the embodiments of the present disclosure.

The experimental setup is done in an indoor environment in TCS office premises through both online as well as offline performance evaluation of the disclosed system. The RSS prediction system is developed on python. For offline experimentation, three datasets are used. The first dataset is taken from Parasuraman, R., Min, B. C., & Ögren, P. (2023). Rapid prediction of network quality in mobile telerobots. Ad Hoc Networks, 138, 103014, to generate state of art comparison results. And the other two datasets are generated indoors in the office premises. The developed system is deployed on a real-life telerobot named "double three". For the indoor dataset collection, two scenarios are considered where the telerobot had given two possible paths to reach to the destination. But the situation is made wherein taking the shorter path leads to loss of connectivity and whereas taking the other path ensures stable communication channel throughout its trajectory. To collect both the datasets, the telerobot is made to traverse the possible paths to the destination passing through multiple office rooms and simultaneously collecting the odometry and corresponding RSS measurements. Therefore, the collected indoor office dataset includes both Line of Sight (LOS) as well as Non-Line of Sight (NLOS) data. The workplace setup and telerobot's trajectory for dataset collection is shown in FIG. 10. The RSS is sampled at a frequency of 10 Hz, where the dataset is collected and later run offline on a normal PC (Intel core i7 machine) for offline performance evaluation of prediction accuracy of our system. The variations in indoor environment are quite dynamic and do not simply follow the principles of path loss but are under the constant effect of shadowing and multipath fading as well. FIGS. 11A-11C depicts RSS in real world environment wherein FIG. 11A shows variation of RSS in indoor workplace for the first dataset, FIG. 11B shows variation of RSS in the second dataset and FIG. 11C shows variation in the third dataset. For the purpose of experimentation, value of RSSI is assumed at a reference distance (RSSd0) about −35 dbm and prediction error threshold about 3 dbm. For online performance evaluation the disclosed system, the RSS prediction algorithm is deployed in a real telepresence system on double three telerobot as a browser application. For this, a WebRTC (Web Real-Time Communications) based browser interfaced framework is designed using JavaScript between the telerobot and the remote-operator while session is established using a session manager situated in the cloud. A bi-directional media-channel for audio/video transmission have been created between them along with bi-directional data-channels which is responsible to exchange the kinematic control commands for telerobot's actuation and the different sensor information including the current and predicted RSSI values. The browser page running at telerobot side receives the RSSI values from its local program space through a WebSocket based communication channel and upon receiving, it sends these values over the data-channel. The remote operator can see the received RSSI values on his/her browser GUI. FIG. 12 shows the browser page on operator's console. The operator can see the remote scene captures using the telerobot's camera and corresponding floor map of the region the telerobot is traversing through. Using the navigation command buttons provided, the operator can remotely maneuver the telerobot. Additionally, at every point, the RSS predictions P steps ahead along the different directions are also provided to the operator though a visual meter like representation. This assists the remote operator to choose an optimal path with stable connectivity and navigate the telerobot accordingly.

Performance Evaluation of the Mobile Telerobot

Based on manual operation of the mobile telerobot as per the system disclosed in the present invention, performance of the mobile telerobot have been evaluated off-line based on the following evaluation metrics:

i). Prediction error. Prediction Error (errori) is estimated as absolute difference between predicted value of RSS and actual RSS value at point i shown in equation 13.

$$\text{error}_i = RSS^i_{pred} - RSS^i \tag{13}$$

ii). Mean Absolute Error (MAE). MAE is computed as the mean of absolute value of the error between predicted and actual value of RSS along the trajectory of the mobile telerobot as per Equation 14.

$$MAE = \sum\nolimits_{i=1}^{N} \left\| RSS^i_{pred} - RSS^i \right\| \tag{14}$$

where, $RSS^i$ is the actual/ground truth value of RSS at point I and $$RSS^i_{pred}$$

is the predicted value of RSS at point i along telerobot's trajectory.

iii). Average Mean Absolute Error (MAEavg). The MAEavg values for each prediction distance gives us the value of Average Mean Absolute Error as per equation 15.

$$MAE_{avg} = \sum MAE_p \tag{15}$$

iv). Mean Absolute Percentage Error (MAPE). MAPE is computed by normalizing the error using the actual value of RSS at a particular point, and then calculating mean of that value as per equation 16.

$$MAPE = \sum\nolimits_{i=1}^{N} \frac{\left\| RSS^i_{pred} - RSS^i \right\|}{\left\| RSS^i \right\|} \tag{16}$$

v). Mean Prediction Accuracy (MPA). It is computed using equation 17.

$$MPA = 100(1 - MAPE) \tag{17}$$

Comparative Evaluation of the Performance:

An evaluation of the performance of the disclosed method with that of the state-of-art method is made (state-of-art method reference: Parasuraman, R., Min, B. C., & Ögren, P. (2023). Rapid prediction of network quality in mobile telerobots. Ad Hoc Networks, 138, 103014) using the dataset provided by the state of art. The evaluation is done in terms of the MAE metric and the result is presented in FIG. 13 for the prediction distances of 3 meter (m), 5 m, 7 m and 10 m. For shorter prediction distance like 3 m, both methods (disclosed invention and state of art) achieve at par performance, but as prediction distance increase (>=5 m), the disclosed method outperforms the state of art method. Additionally, it is seen that the degree to which disclosed method performs better than the state of art increases with the increasing prediction distance. For the prediction distance of 10 m, the disclosed method performs better than the state of art approach. This is extremely vital as the present disclosure can effectively assist the remote operator to choose an optimal path to destination with stable connectivity pretty much in advance, thereby avoiding unnecessary back-tracing.

Evaluation of Indoor Datasets

Figure 14A:
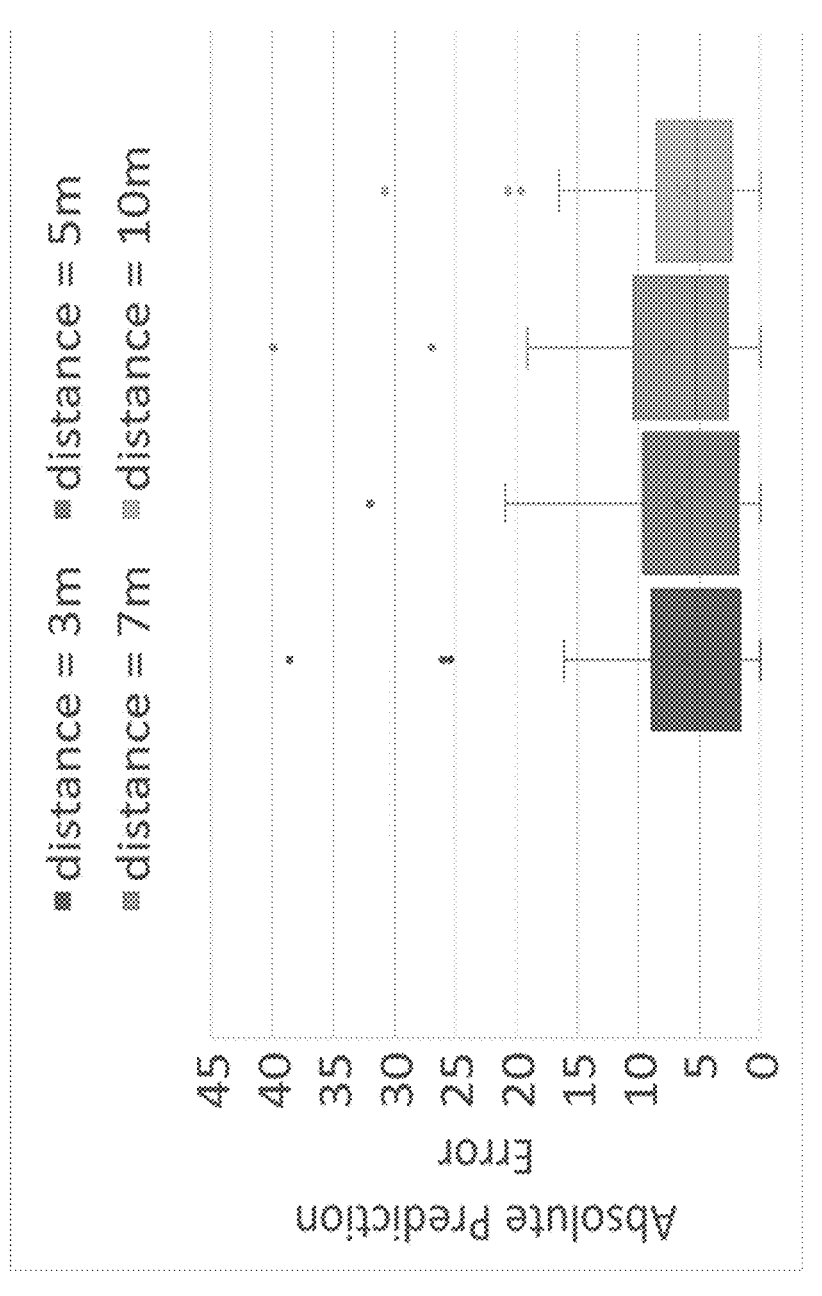
FIGS. 14A and 14B show variation of prediction error with increasing prediction distance on second dataset and third dataset respectively, according to some of the embodiments of the present disclosure.
Figure 14B:
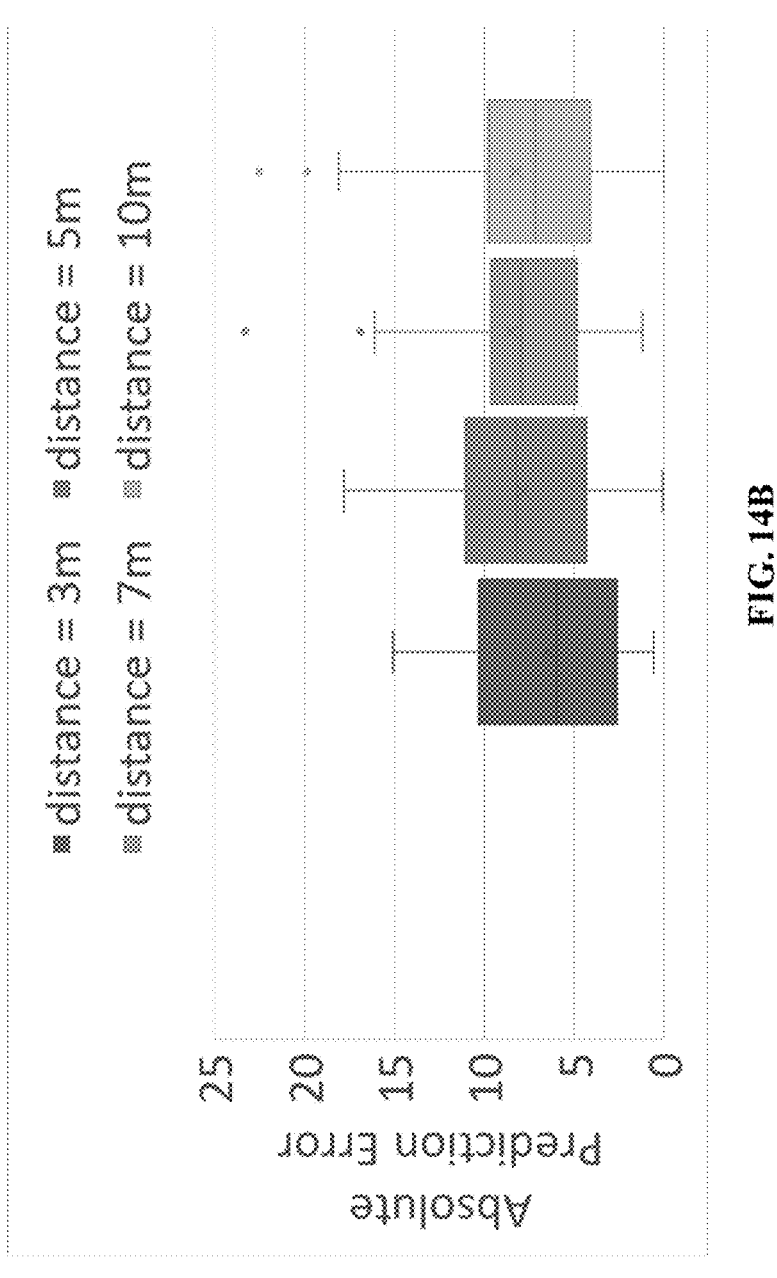

FIGS. 14A and 14B show variation of prediction error with increasing prediction distance on second dataset and third dataset collected in office premises, respectively. Both the datasets are collected in the indoor premises of the TCS office. It is observed that for both datasets, with increasing prediction distance the prediction error increases but remains within 10 dbm for most of the data points in both the cases. Table I shows the MAE averaged over all prediction distances from 1 m to 10 m, MAPE and MPA values for the first dataset (state-of-art), the second dataset and the third dataset. It is clearly seen that the second and the third dataset has good prediction accuracy, sometimes close to 90% proving the efficacy of disclosed RSS prediction algorithm.

TABLE I

| | First Dataset [State-of-art] | Second Dataset | Third Dataset |
|---|---|---|---|
| MAEavg | 8.3462902 | 6.429910 | 7.631490 |
| MAPE | 0.199699 | 0.1120598 | 0.1032105 |
| MPA | 80.030030454 | 88.79401 | 89.678948 |

Figure 15:
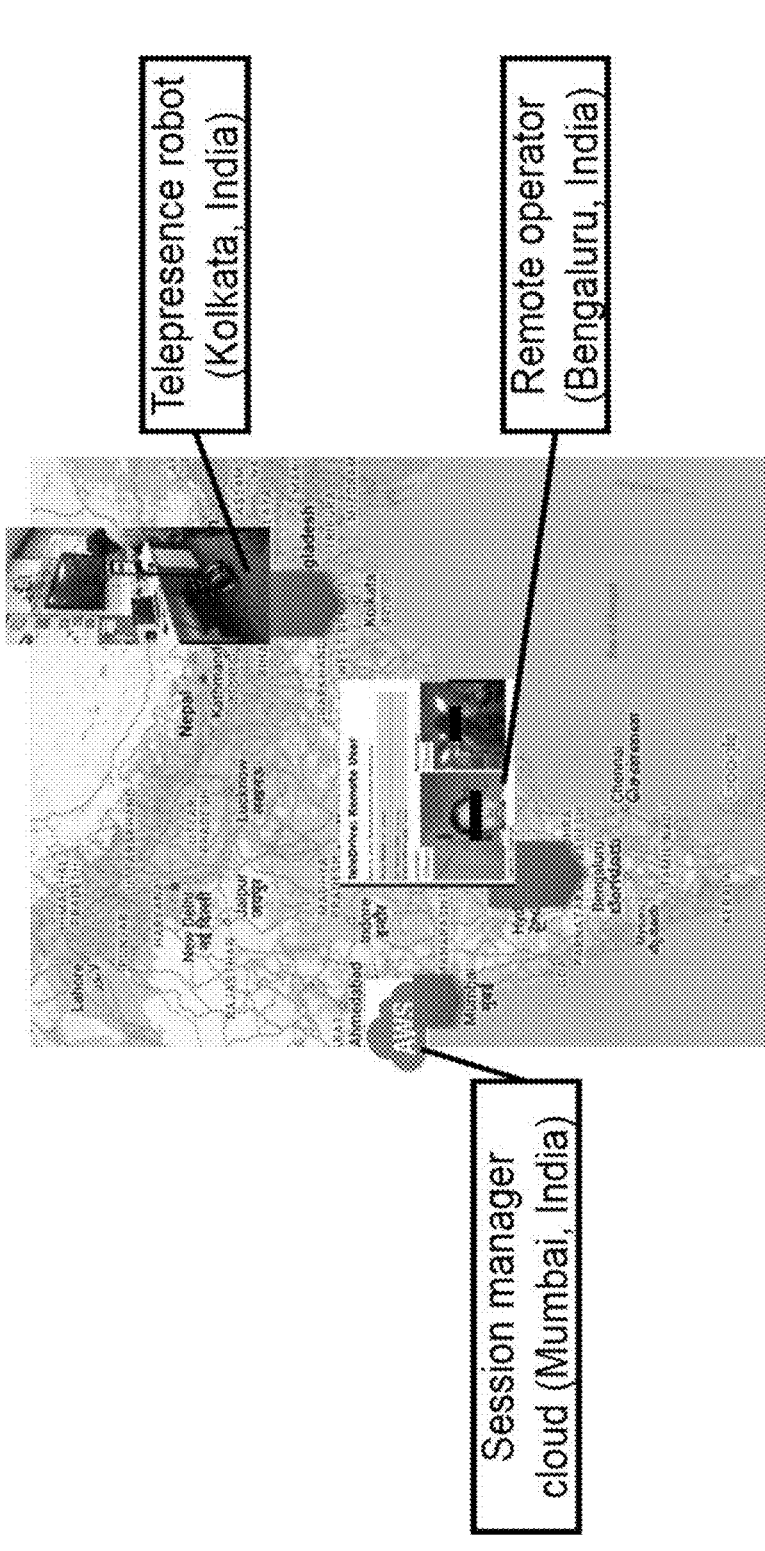
FIG. 15 depicts the connection set-up of an online performance evaluation of the mobile telerobot, according to some of the embodiments of the present disclosure.
Figure 16:
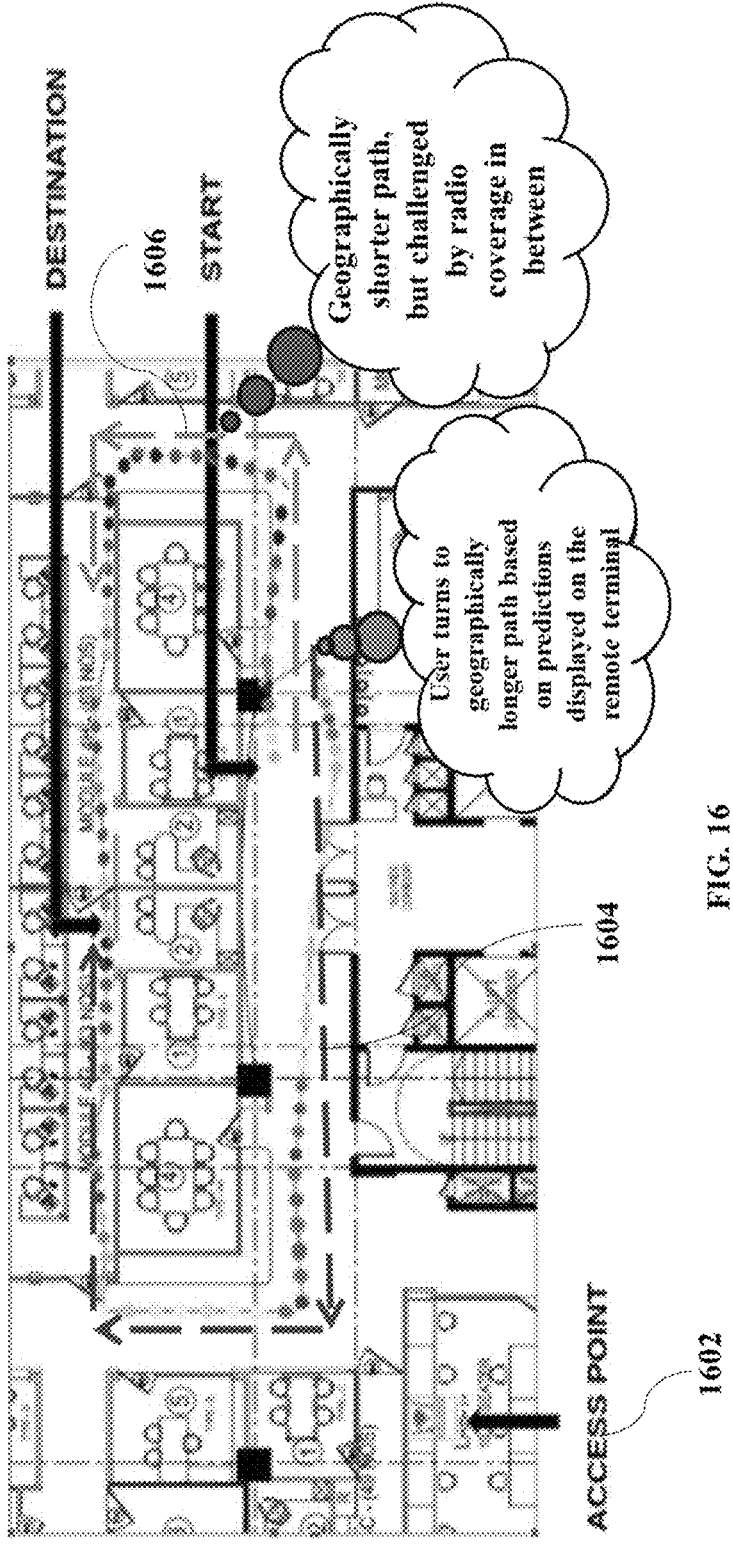
FIG. 16 illustrates possible paths of the mobile telerobot in an office set-up, according to some of the embodiments of the present disclosure.
Figure 17A:
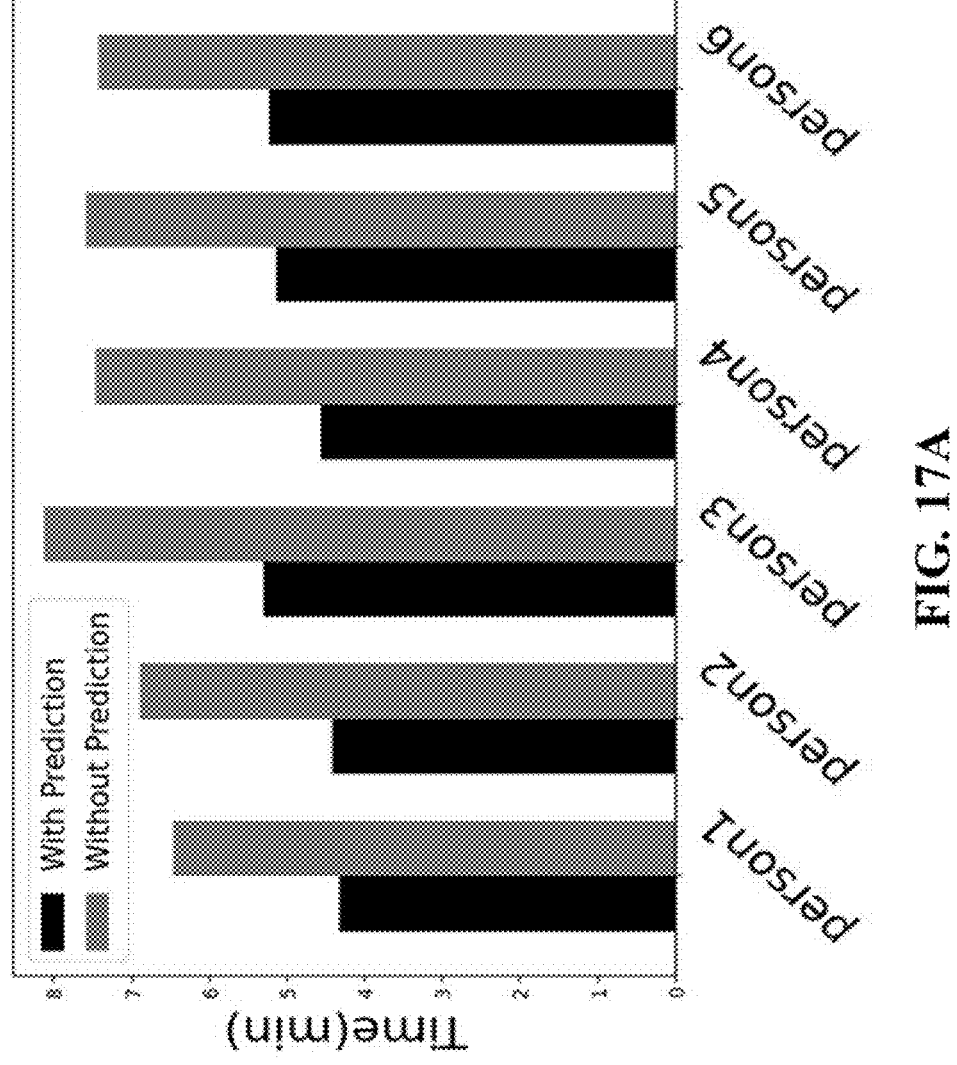

Online Performance Evaluation:

The disclosed system based on RSS prediction algorithm has been evaluated online in TCS office premises in an indoor setup. The mobile telerobot and remote operator are set to connect over the Internet from two geographically distinct locations. The telerobot is kept in West Bengal and operator made to operate from Bengaluru (Bangalore), Karnataka. The operator and the telerobot are connected over Amazon Web Service (AWS) server hosted in Mumbai. The entire connection setup is shown in FIG. 15. The mobile telerobot started its trajectory from the starting point marked in FIG. 16. The access point 1602 is set as one corner in the office. To reach the marked destination telerobot had two possible paths. The shorter path 1606 is marked in light grey dotted line and the longer path 1604 is marked in black dotted line. The location of physical AP is also marked in the diagram. The shorter path 1606 has incredibly low signal connectivity due to path loss, shadowing, and multipath fading effect along that path. Without the disclosed RSS prediction algorithm, the remote navigator prefers to take the shorter path, there are high chances of loss of connectivity along the shorter path 1606 in the above setup. Therefore, taking the shorter path 1606 might lead to unnecessary back-tracing and then exploring the other possible paths to destination. This might end up taking longer time to reach the destination. Whereas, if the remote operator takes the other path, it will have stable connectivity throughout its trajectory and reach the destination in one go. To validate this, the telerobot controlled by a remote operator is made to navigate from the designated starting point to the destination with and without using the disclosed RSS prediction algorithm. The remote operator receives periodic feedbacks from the telerobot containing the measured RSS at each point the telerobot traverses, using which the remote operator can decide when to back-trace to avoid going to a no signal zone. The experiment is repeated five times with 5 different people who remotely operated the mobile telerobot one at a time for 10 times each. The time required to reach a destination from starting point is recorded and then averaged for each person. It can be clearly seen in FIG. 17A that navigation using the RSS prediction algorithm-based system takes much less time than without it. This indicates that without the RSS prediction algorithm-based system, the remote operator might have chosen the shortest path, kept traversing along it till it received an extremely low signal value, then it might have to back-trace and chose the other path. Whereas, with the disclosed RSS prediction algorithm-based system, the remote operator is able to predict the connectivity along the two possible paths way ahead in time, therefore avoided low connectivity paths even though they might be the shorter ones.

The accuracy of the disclosed RSS prediction algorithm-based system lies on the accuracy of localization of virtual radio source. For the subsequent points, the localization happens using Trilateration based optimization algorithm which is a well-established method. But for the first point, the localization of virtual AP happens by determination of direction of the AP with respect to the current pose of the telerobot. This estimation is vital as it enables future prediction of RSS from the first point itself eliminating the need for an initial training phase and is fed as an input to the Trilateration algorithm for the first iteration. Therefore, 10 more users are asked to remotely perform this localization of virtual AP using double 3 telerobot from the designated 5 distinct locations the indoor office premises as shown in FIG. 8. The users had an estimate about the actual location of physical AP hence are suggested to them to rate (out of 5 with 5 being the best rating) how accurately the localization algorithm could estimate the location of virtual AP. The experiment has been performed at all the 5 locations by 10 different users separately and the Mean Opinion Score (MOS) across the five locations are averaged for all the users. FIG. 17B shows the average MOS score and standard deviation obtained with and without using our RSS prediction algorithm. It can be clearly seen that the localization algorithm at first point worked considerably good for all the 5 different starting locations, therefore is independent of the starting location of the telerobot. This proves efficacy of the disclosed virtual AP localization algorithm at the first point.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

Therefore, the RSS prediction algorithm-based method and system for predicting best-connected future path for a telerobot is disclosed. A radio-source agnostic online RSS prediction system based on the past measurements of odometry and corresponding RSS values to assist the remote operator controlling the mobile telerobot in choosing an optimal path to destination with stable connectivity in real life telepresence/teleoperation systems is achieved. The RSS prediction algorithm rests on the novel concept of virtual radio source and dynamic localization of this virtual AP along the moving telerobot. The performance evaluation of the system is done using objective measures on datasets and subjective metrics. The disclosed invention successfully addresses the challenge of identifying best-connected path from the plurality of possible paths in the trajectory of the remotely controlled mobile telerobot. The best-connected path is chosen based on RSS prediction done on the current location of the mobile telerobot that guides the mobile telerobot to navigate to the future points situated at P steps ahead in the trajectory of the mobile telerobot. The disclosed radio-source agnostic online RSS prediction system assists the remote operator controlling the mobile telerobot in choosing an optimal path to destination with stable connectivity in real life telepresence/teleoperation systems.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein.

What is claimed is:

1. A method of sensing best-connected future path for a mobile telerobot, the method comprising:

receiving, via one or more hardware processors, an odometry and a corresponding received radio signal strength (RSS) measurement at a current location of the mobile telerobot, wherein the odometry comprises information data used by a motion sensor of the mobile telerobot to estimate change in position over time, wherein the mobile telerobot is controlled by a remote operator via a controller communicating with the mobile telerobot, wherein the mobile telerobot take a plurality of possible paths to reach a destination point from a source location;

estimating, via the one or more hardware processors, a virtual access point (AP) location from the current location of the mobile telerobot comprising steps:

obtaining a first virtual AP location followed by estimating subsequent virtual AP locations, wherein the subsequent virtual AP locations are estimated until error between predicted RSS value and received RSS value at the current point remains within a predefined threshold in a trajectory of the mobile telerobot by, revolving the mobile telerobot 360 degrees at the current position to obtain raw RSS values by capturing the RSS across 360 degrees that are influenced by the environmental factors including static and dynamic obstacles along telerobot's trajectory, filtering the raw RSS values to obtain filtered RSS values through Butterworth order low pass filter with predefined cutoff frequency, determining a burst maximum of the filtered RSS values and corresponding peak to obtain a peak angle, and estimating the first virtual AP location using the peak angle;

determining, via the one or more hardware processors, a subsequent virtual AP location using a Trilateration algorithm, for a prediction error at the current point exceeds a pre-defined threshold, wherein the Trilateration algorithm uses three reference nodes to calculate the positions of unknown node, and uses a Received Signal Strength Indicator (RSSI) value at points previously traversed by the mobile robot along its trajectory to estimate the subsequent virtual AP location, wherein the first AP location becomes an input parameter to the Trilateration algorithm, wherein the prediction error is computed for each advancing move based on the RSSI obtained at the point where the mobile telerobot moves and the RSSI value for that current point is predicted at that point using the current RSS prediction model;

iteratively obtaining, via the one or more hardware processors, subsequent virtual AP locations as the mobile telerobot advances to the next move upon its traversal, wherein the subsequent virtual AP location is calculated at the current point for the prediction at that point exceeds the pre-defined threshold based on the estimated location of virtual AP;

calculating, via the one or more hardware processors, a virtual distance between the virtual AP location and a future point wherein the future point is the set of coordinates of an unvisited point along the trajectory of the mobile telerobot P steps ahead from the current positions of the mobile telerobot, wherein the unvisited future point on the trajectory of the mobile telerobot is identified based on (i) a current pose of the telerobot, (ii) a direction of the future point and (iii) the co-ordinates of the current point of the mobile telerobot;

wherein the virtual AP location is calculated using an equation:

$$xa = d\sin(\alpha)$$
$$ya = d\cos(\alpha)$$

wherein d is an Euclidean distance between the first location and the AP determined using the received RSS and wherein the Euclidean distance is calculated by equation:

$$d = \text{antilog}\,10\,\frac{RSS_{d0} - RSS_{d,t}}{10\,\eta}$$

where, d0 is the reference distance usually 1 m, RSSd0 is the received RSS at a reference distance, $\eta$ is an environment dependent path loss parameter, and $\alpha$ is a peak angle corresponding to burst maximum values of filtered RSS obtained in the previous steps;

feeding, via the one or more hardware processors, the virtual distance into a path loss model to predict the RSS at the future point, wherein the predicted RSS at the future point assists the remote operator navigating the mobile telerobot via the controller to choose best-connected path from the plurality of possible paths; and identifying, via one or more hardware processors, best-connected path from the plurality of possible paths based on the predicted RSS at the future point, wherein at any point in telerobot's trajectory, prediction of RSS at future, unvisited points along the possible paths to destination helps the remote operator to decide which path to take and the telerobot standing at a point makes P steps ahead prediction along different directions based on the calculated RSS at the future point which assists the remote operator to choose the best-connected path among the plurality of possible paths for the mobile telerobot.

2. The method as claimed in claim 1, wherein the first estimated virtual AP location, an odometry and the RSS of at least three points previously traversed by the mobile telerobot are provided as input parameters to a first round of Trilateration algorithm, wherein previously estimated virtual AP location obtained from the previous iteration of Trilateration algorithm, an odometry and the RSS information of at least three points previously traversed by the mobile telerobot are provided as input parameters to a subsequent iterations of the Trilateration algorithm.

3. The method as claimed in claim 1, wherein filtering of raw RSS involves passing the raw RSS through Butterworth order low pass filter with pre-defined cutoff frequency.

4. The method as claimed in claim 1 wherein the Trilateration algorithm is applied to predict the virtual AP location using the following set of equations:

$$d_1 = \sqrt{(xa - x_1)^2 + (ya - y_1)^2}$$
$$d_2 = \sqrt{(xa - x_2)^2 + (ya - y_2)^2}$$
$$d_3 = \sqrt{(xa - x_3)^2 + (ya - y_3)^2}$$

wherein (xa,ya) is the estimated location of virtual AP, (xi,yi) corresponds of each point i already traversed by the mobile telerobot along its trajectory and $d_i$ is the corresponding Euclidean distance of point i from the radio source computed using the RSS received at each point i.

5. The method as claimed in claim 1, wherein the coordinates of the future point are calculated using equation:

$$x_p = x + (P * \sin(\theta + \beta))$$
$$y_p = y + (P * \cos(\theta + \beta))$$

wherein the future point is assumed to be P steps ahead from the current location (x,y), and in $\beta$ direction with respect to the current pose of the mobile telerobot $\theta$.

6. A system, comprising:
a memory storing instructions;
one or more communication interfaces; and
one or more hardware processors coupled to the memory via the one or more communication interfaces, wherein the one or more hardware processors are configured by the instructions to:
receive an odometry and a corresponding RSS measurement at a current location of the mobile telerobot, wherein the odometry comprises information data used by a motion sensor of the mobile telerobot to estimate change in position over time, wherein the mobile telerobot is controlled by a remote operator via a controller communicating with the mobile telerobot, wherein the mobile telerobot take a plurality of possible paths to reach a destination point from a source location;

estimate a virtual access point (AP) location from the current location of the mobile telerobot comprising:

obtaining a first virtual AP location followed by estimating subsequent virtual AP locations, wherein the subsequent virtual AP locations are estimated until error between predicted RSS value and received RSS value at the current point remains within a pre-defined threshold in a trajectory of the mobile telerobot by, revolving the mobile telerobot 360 degrees at a current position to obtain the raw received radio signal strength (RSS) values by capturing the RSS across 360 degrees that are influenced by the environmental factors including static and dynamic obstacles along telerobot's trajectory, filtering the raw RSS values to obtain filtered RSS values through Butterworth order low pass filter with predefined cutoff frequency, determining a burst maximum of the filtered RSS values and corresponding peak to obtain a peak angle, estimating the first virtual AP location using the peak angle;

determine a subsequent virtual AP location using a Trilateration algorithm, for a prediction error at the current point exceeds a pre-defined threshold, wherein the Trilateration algorithm uses three reference nodes to calculate the positions of unknown node, and uses a Received Signal Strength Indicator (RSSI) value at points previously traversed by the mobile robot along its trajectory to estimate the subsequent virtual AP location, wherein the first AP location becomes an input parameter to the Trilateration algorithm, wherein the prediction error is computed for each advancing move based on the RSSI obtained at the point where the mobile telerobot moves and the RSSI value for that current point is predicted at that point using the current RSS prediction model;

iteratively obtain subsequent virtual AP locations as the mobile telerobot advances to the next move upon its traversal, wherein the subsequent virtual AP location is calculated at the current point if the prediction at that point exceeds the pre-defined threshold;

calculate a virtual distance between the virtual AP location and a future point wherein the future point is the set of coordinates of an unvisited point along the trajectory of the mobile telerobot P steps ahead from the current positions of the mobile telerobot, wherein the unvisited future point on the trajectory of the mobile telerobot is identified based on (i) a current pose of the telerobot, (ii) a direction of the future point and (iii) the co-ordinates of the current point of the mobile telerobot;

wherein the virtual AP location is calculated using an equation:

$$xa = d\sin(\alpha)$$

$$ya = d\cos(\alpha)$$

wherein d is an Euclidean distance between the first location and the AP determined using the received RSS and wherein the Euclidean distance is calculated by equation:

$$d = \text{antilog } 10 \frac{RSS_{d0} - RSS_{d,t}}{10\,\eta}$$

where, d0 is the reference distance usually 1 m, $RSS_{d0}$ is the received RSS at a reference distance, $\eta$ is an environment dependent path loss parameter, and $\alpha$ is a peak angle corresponding to burst maximum values of filtered RSS obtained in the previous steps;

feed the virtual distance into a path loss model to predict the RSS at the future point;

wherein the predicted RSS at the future point assists a remote operator navigating the mobile telerobot to choose the best-connected path from the plurality of possible paths; and identify, best-connected path from the plurality of possible paths based on the predicted RSS at the future point, wherein at any point in telerobot's trajectory, prediction of RSS at future, unvisited points along the possible paths to destination helps the remote operator to decide which path to take and the telerobot standing at a point makes P steps ahead prediction along different directions based on the calculated RSS at the future point which assists the remote operator to choose the best-connected path among the plurality of possible paths for the mobile telerobot.

7. The system of claim 6, wherein the first estimated virtual AP location, an odometry and the RSS of at least three points previously traversed by the mobile telerobot are provided as input parameters to a first round of Trilateration algorithm, wherein previously estimated virtual AP location obtained from the previous iteration of Trilateration algorithm, an odometry and the RSS information of at least three points previously traversed by the mobile telerobot are provided as input parameter to a subsequent iterations of the Trilateration algorithm.

8. The system of claim 6, wherein filtering of raw RSS involves passing the raw RSS through Butterworth order low pass filter with pre-defined cutoff frequency.

9. The system of claim 6, wherein the Trilateration algorithm is applied to predict the virtual AP location using the following set of equations:

$$d_1 = \sqrt{(xa - x_1)^2 + (ya - y_1)^2}$$

$$d_2 = \sqrt{(xa - x_2)^2 + (ya - y_2)^2}$$

$$d_3 = \sqrt{(xa - x_3)^2 + (ya - y_3)^2}$$

wherein (xa,ya) is the estimated location of virtual AP, $(x_i,y_i)$ corresponds of each point i already traversed by the mobile telerobot along its trajectory and $d_i$ is the corresponding Euclidean distance of point i from the radio source computed using the RSS received at each point i.

10. The system of claim 6, wherein the coordinates of the future point are calculated using equation:

$$x_p = x + (P * \sin(\theta + \beta))$$

$$y_p = y + (P * \cos(\theta + \beta))$$

wherein the future point is assumed to be P steps ahead from the current location (x,y), and in $\beta$ direction with respect to the current pose of the mobile telerobot $\theta$.

11. One or more non-transitory machine-readable information storage mediums comprising one or more instructions which when executed by one or more hardware processors cause:

receiving an odometry and a corresponding received radio signal strength (RSS) measurement at a current location of the mobile telerobot, wherein the odometry comprises information data used by a motion sensor of the mobile telerobot to estimate change in position over time, wherein the mobile telerobot is controlled by a remote operator via a controller communicating with the mobile telerobot, wherein the mobile telerobot take a plurality of possible paths to reach a destination point from a source location;

estimating a virtual access point (AP) location from the current location of the mobile telerobot comprising steps:

obtaining a first virtual AP location followed by estimating subsequent virtual AP locations, wherein the subsequent virtual AP locations are estimated until error between predicted RSS value and received RSS value at the current point remains within a pre-defined threshold in a trajectory of the mobile telerobot by, revolving the mobile telerobot 360 degrees at the current position to obtain raw RSS values by capturing the RSS across 360 degrees that are influenced by the environmental factors including static and dynamic obstacles along telerobot's trajectory, filtering the raw RSS values to obtain filtered RSS values through Butterworth order low pass filter with predefined cutoff frequency, and determining a burst maximum of the filtered RSS values and corresponding peak to obtain a peak angle, estimating the first virtual AP location using the peak angle;

determining a subsequent virtual AP location using a Trilateration algorithm, for a prediction error at the current point exceeds a pre-defined threshold, wherein the Trilateration algorithm uses three reference nodes to calculate the positions of unknown node, and uses a Received Signal Strength Indicator (RSSI) value at points previously traversed by the mobile robot along its trajectory to estimate the subsequent virtual AP location, wherein the first AP location becomes an input parameter to the Trilateration algorithm, wherein the prediction error is computed for each advancing move based on the RSSI obtained at the point where the mobile telerobot moves and the RSSI value for that current point is predicted at that point using the current RSS prediction model;

iteratively obtaining subsequent virtual AP locations as the mobile telerobot advances to the next move upon its traversal, wherein the subsequent virtual AP location is calculated at the current point for the prediction at that point exceeds the pre-defined threshold based on the estimated location of virtual AP;

calculating a virtual distance between the virtual AP location and a future point wherein the future point is the set of coordinates of an unvisited point along the trajectory of the mobile telerobot P steps ahead from the current positions of the mobile telerobot, wherein the unvisited future point on the trajectory of the mobile telerobot is identified based on (i) a current pose of the telerobot, (ii) a direction of the future point and (iii) the co-ordinates of the current point of the mobile telerobot;

wherein the virtual AP location is calculated using an equation:

$$xa = d \sin(\alpha)$$

$$ya = d \cos(\alpha)$$

wherein d is an Euclidean distance between the first location and the AP determined using the received RSS and wherein the Euclidean distance is calculated by equation:

$$d = \text{antilog} \, 10 \frac{RSS_{d0} - RSS_{d,t}}{10 \, \eta}$$

where, d0 is the reference distance usually 1 m, RSSd0 is the received RSS at a reference distance, $\eta$ is an environment dependent path loss parameter, and $\alpha$ is a peak angle corresponding to burst maximum values of filtered RSS obtained in the previous steps;

feeding the virtual distance into a path loss model to predict the RSS at the future point, wherein the predicted RSS at the future point assists a remote operator navigating the mobile telerobot via a controller to choose the best-connected path from the plurality of possible paths; and identifying, via one or more hardware processors, best-connected path from the plurality of possible paths based on the predicted RSS at the future point, wherein at any point in telerobot's trajectory, prediction of RSS at future, unvisited points along the possible paths to destination helps the remote operator to decide which path to take and the telerobot standing at a point makes P steps ahead prediction along different directions based on the calculated RSS at the future point which assists the remote operator to choose the best-connected path among the plurality of possible paths for the mobile telerobot.

12. The one or more non-transitory machine-readable information storage mediums of claim 11, wherein the first estimated virtual AP location, an odometry and the RSS of at least three points previously traversed by the mobile telerobot are provided as input parameters to a first round of Trilateration algorithm, wherein previously estimated virtual AP location obtained from the previous iteration of Trilateration algorithm, an odometry and the RSS information of at least three points previously traversed by the mobile telerobot are provided as input parameter to a subsequent iterations of the Trilateration algorithm.

13. The one or more non-transitory machine-readable information storage mediums of claim 11, wherein filtering of raw RSS involves passing the raw RSS through Butterworth order low pass filter with pre-defined cutoff frequency.

14. The one or more non-transitory machine-readable information storage mediums of claim 11, wherein the Trilateration algorithm is applied to predict the virtual AP location using the following set of equations:

$$d_1 = \sqrt{(xa - x_1)^2 + (ya - y_1)^2}$$

$$d_2 = \sqrt{(xa - x_2)^2 + (ya - y_2)^2}$$

$$d_3 = \sqrt{(xa - x_3)^2 + (ya - y_3)^2}$$

wherein (xa,ya) is the estimated location of virtual AP, (xi,yi) corresponds of each point i already traversed by the mobile telerobot along its trajectory and $d_i$ is the corresponding Euclidean distance of point i from the radio source computed using the RSS received at each point i.

15. The one or more non-transitory machine-readable information storage mediums of claim 11, wherein the coordinates of the future point are calculated using equation:

$$x_p = x + (P * \sin(\theta + \beta))$$

$$y_p = y + (P * \cos(\theta + \beta))$$

wherein the future point is assumed to be P steps ahead from the current location (x,y), and in $\beta$ direction with respect to the current pose of the mobile telerobot $\theta$.

\* \* \* \* \*